United States Patent
Hayashi et al.

(10) Patent No.: US 9,864,474 B2
(45) Date of Patent: Jan. 9, 2018

(54) METHOD FOR MANUFACTURING TOUCH PANEL STRUCTURE, AND METHOD FOR MANUFACTURING DISPLAY APPARATUS

(71) Applicant: Mitsubishi Electric Corporation, Tokyo (JP)

(72) Inventors: Masami Hayashi, Kumamoto (JP); Masaru Aoki, Kumamoto (JP)

(73) Assignee: Mitsuibishi Electric Corporation, Tokyo (JP)

( * ) Notice: Subject to any disclaimer, the term of this patent is extended or adjusted under 35 U.S.C. 154(b) by 28 days.

(21) Appl. No.: 14/926,753

(22) Filed: Oct. 29, 2015

(65) Prior Publication Data

US 2016/0162080 A1 Jun. 9, 2016

(30) Foreign Application Priority Data

Dec. 5, 2014 (JP) .................................. 2014-247123

(51) Int. Cl.
G06F 3/044 (2006.01)
G06F 3/045 (2006.01)
G06F 3/041 (2006.01)

(52) U.S. Cl.
CPC .............. *G06F 3/045* (2013.01); *G06F 3/041* (2013.01); *G06F 3/044* (2013.01); *G06F 3/0412* (2013.01); *G06F 2203/04103* (2013.01)

(58) Field of Classification Search
CPC ........................................... G06F 2203/04103
See application file for complete search history.

(56) References Cited

U.S. PATENT DOCUMENTS

| 8,709,265 | B2 | 4/2014 | Misaki | |
|---|---|---|---|---|
| 2012/0206395 | A1 | 8/2012 | Misaki | |
| 2012/0241408 | A1* | 9/2012 | Misaki | G02F 1/1333 216/20 |
| 2013/0278549 | A1* | 10/2013 | Hayashi | H05K 3/061 345/174 |

(Continued)

FOREIGN PATENT DOCUMENTS

| JP | 2009-294815 A | 12/2009 |
|---|---|---|
| JP | 2013-045261 A | 3/2013 |

(Continued)

OTHER PUBLICATIONS

Official Filing Receipt issued in U.S. Appl. No. 14/741543, dated Jun. 29, 2015.

*Primary Examiner* — Sanghyuk Park
(74) *Attorney, Agent, or Firm* — Studebaker & Brackett PC

(57) ABSTRACT

A contact hole that penetrates a protective insulating film, an interlayer insulating film, and a transparent cap film and has a surface of a low-reflection film uncovered as a bottom surface is formed in a lead-out wiring region. A lower-layer terminal portion is formed by the low-reflection film and a low-resistance conductive film below the bottom surface of the contact hole. A contact hole that penetrates the protective insulating film and a transparent cap film and has a surface of a low-reflection film uncovered as a bottom surface is formed in the lead-out wiring region. An upper-layer terminal portion is formed by the low-reflection film and a low-resistance conductive film below the bottom surface of the contact hole.

4 Claims, 11 Drawing Sheets

(56) References Cited

U.S. PATENT DOCUMENTS

| | | | |
|---|---|---|---|
| 2013/0285079 A1* | 10/2013 | Hayashi | H01L 33/44 257/88 |
| 2013/0299222 A1 | 11/2013 | Lee et al. | |
| 2015/0177876 A1 | 6/2015 | Ishii et al. | |

FOREIGN PATENT DOCUMENTS

| | | |
|---|---|---|
| JP | 2013-222123 A | 10/2013 |
| JP | 2013-235593 A | 11/2013 |
| JP | 2014-0164944 A | 1/2014 |
| WO | 2011/052392 A1 | 5/2011 |
| WO | 2011/065292 A1 | 6/2011 |
| WO | 2015133041 A1 | 9/2015 |

* cited by examiner

F I G. 1 0
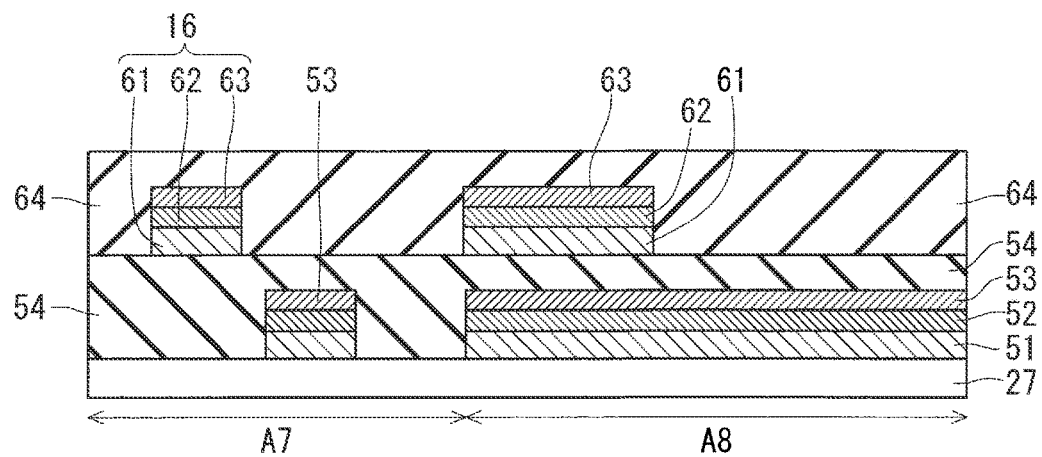
F I G. 1 1
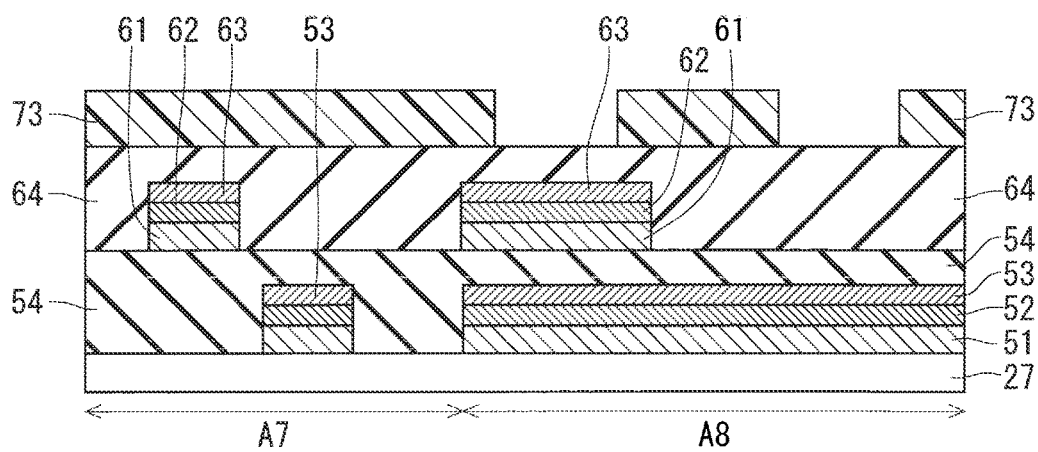
F I G. 1 2
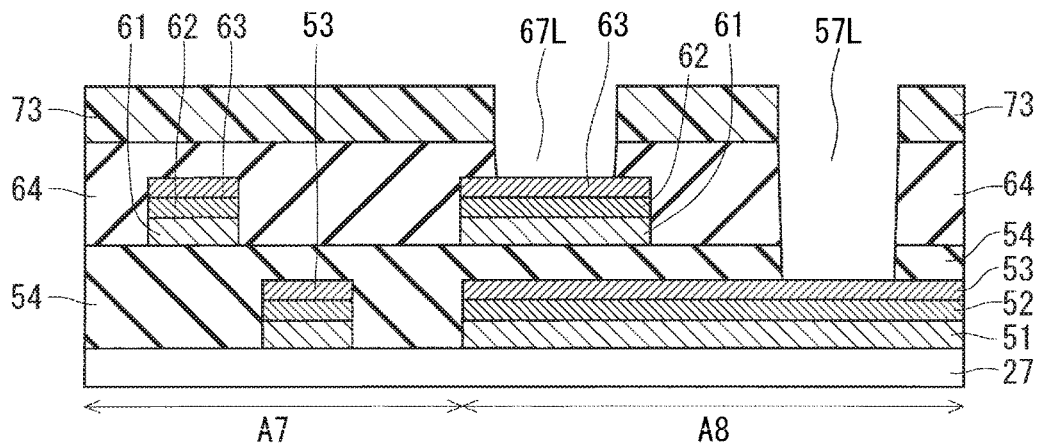

F I G. 2 5
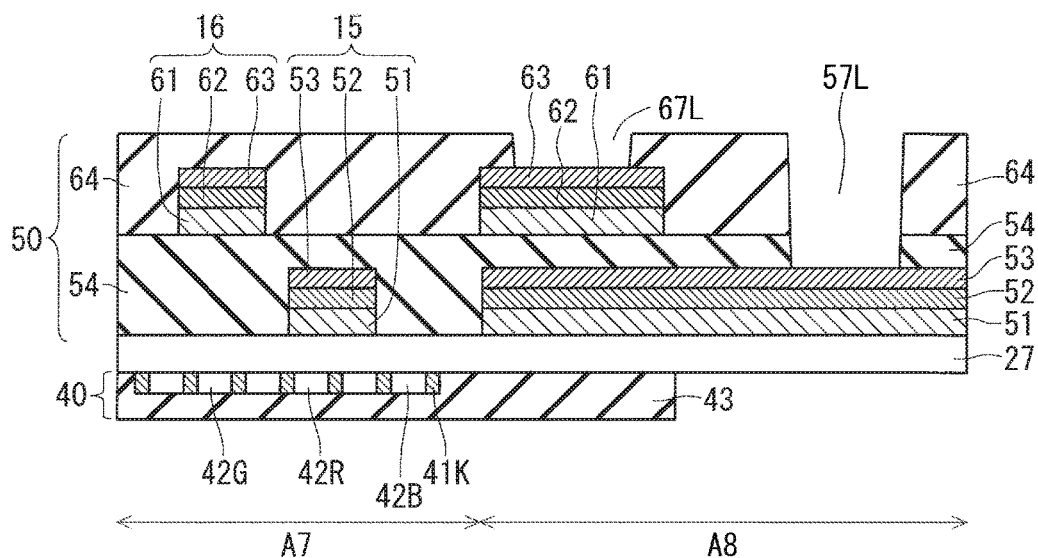
F I G. 2 6
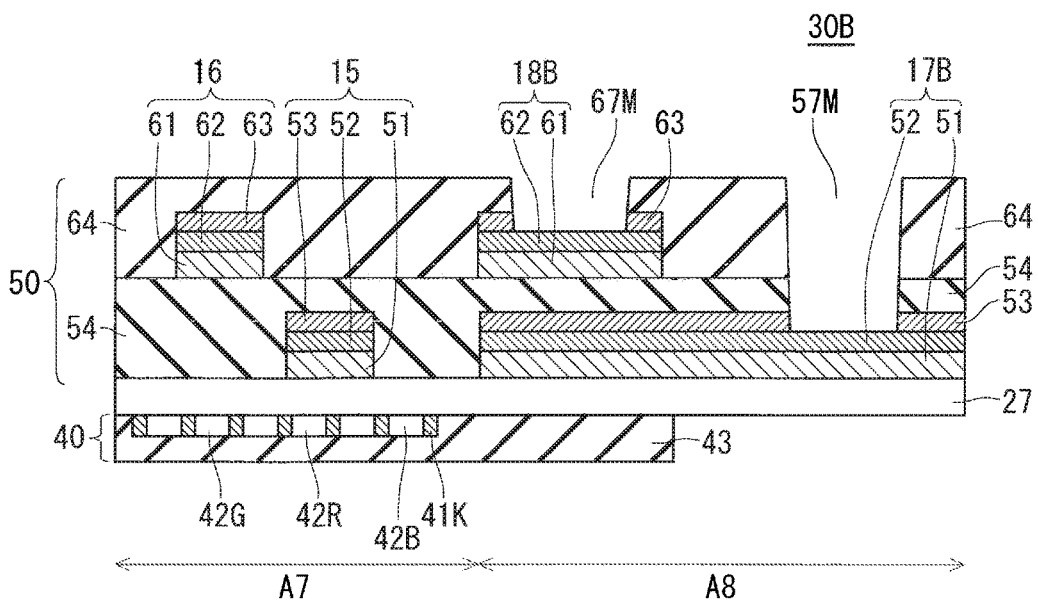

F I G . 2 7
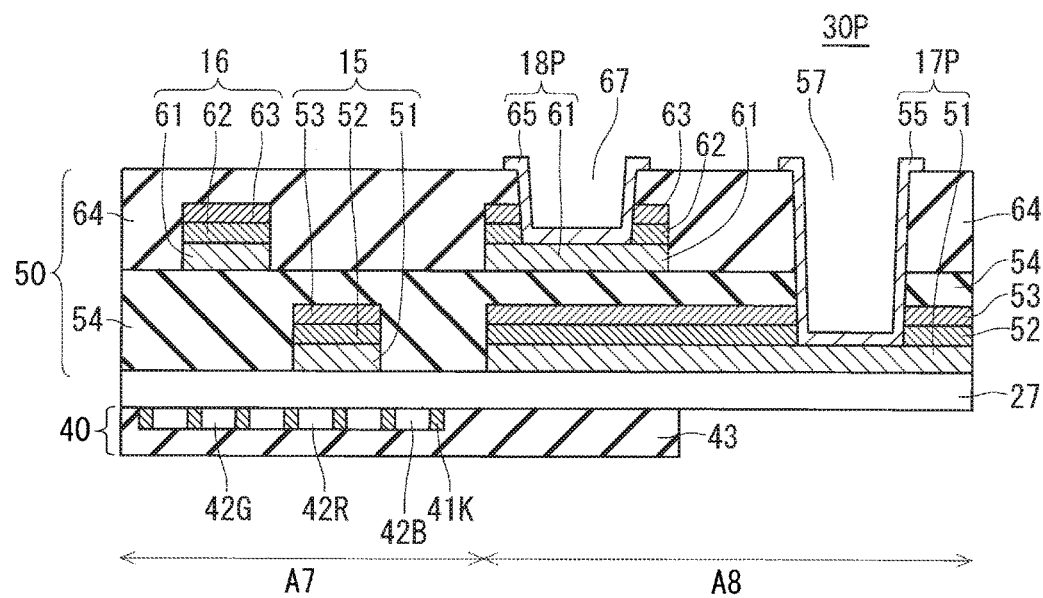

METHOD FOR MANUFACTURING TOUCH PANEL STRUCTURE, AND METHOD FOR MANUFACTURING DISPLAY APPARATUS

BACKGROUND OF THE INVENTION

Field of the Invention

The present invention relates to a touch panel structure including a color filter and a method for manufacturing the same, and a display apparatus and a method for manufacturing the same, and more particularly, to a touch panel structure suitable for outdoor use.

Description of the Background Art

Display apparatuses including touch panels for outdoor use need to have excellent display characteristics in an environment in which an amount of incident light from the outside of the display apparatuses is high, such as use under sunlight. In other words, wiring of the touch panels needs to have characteristics of a low reflection to the incident light from the outside of the display apparatuses and of high transmittance of light from light sources for display. Meanwhile, an electrical resistance also needs to be low for responsiveness and sensitivity of touch sensors needed for the touch panels.

Further, the touch sensor is formed on one main surface opposite to the other main surface of the same substrate on which a color filter is formed, that is to say, on-cell is performed, so that a thickness of a module in the whole device can be reduced more than that in a case where a touch panel substrate is provided separately. Thus, the display apparatuses including the touch panels on which the on-cell is performed are effective in improving functions by reducing thickness and weight and effective in reducing cost by simplifying a structure.

Thus, International Patent Publication No. WO2011/065292 discloses a touch panel structure and a method for manufacturing the same as follows. The touch panel structure includes a touch sensor formed on one main surface opposite to the other main surface of the same substrate on which a color filter is formed. A transparent conductive film that has a relatively high resistance compared with metal in a display portion, has a low reflection to incident light from the outside of a display apparatus, and has high transmittance of light from a light source for display is used for wiring of the touch sensor. A metal material such as aluminum having a resistance lower than that of the transparent conductive film is used for a connection terminal portion and lead-out wires for outputting an electrode potential of a touch panel to an external circuit substrate.

Meanwhile, International Patent Publication No. WO2011/052392 describes a touch panel structure and a method for manufacturing the same as follows. The touch panel structure includes a touch sensor formed on one main surface opposite to the other main surface of the same substrate on which a color filter is formed. A metal film having a low resistance is used for wiring of the touch sensor, and the touch sensor is disposed in such a position as to overlap a portion of a display portion except for an opening in a thickness direction of a display panel so as not to shield light from a light source for display.

Further, Japanese Patent Application Laid-Open No. 2013-222123 describes a touch panel structure and a method for manufacturing the same as follows. The touch panel structure is used for wiring of the touch panel having an anti-reflection function for the purpose of disposing an anti-reflection film on aluminum alloy wiring to reduce a reflection to incident light from the outside of a display apparatus, the wiring being formed by an aluminum film, an aluminum nitride film (low-reflection film), and a transparent film as an example.

However, the touch panel structure disclosed in International Patent Publication No. WO2011/065292 is complicated, and the transparent conductive film in the display portion still has a high resistance, and thus an excellent electrical characteristic for upsizing (large screen) in particular cannot be obtained.

The touch panel structure disclosed in International Patent Publication No. WO2011/052392 needs to align the wiring of the touch panel with a light-shielding layer of the color filter, and thus the design is greatly limited.

On the other hand, the touch panel structure disclosed in Japanese Patent Application Laid-Open No. 2013-222123 includes the wiring having a low resistance, which allows the design of a thin wiring width and sufficiently satisfies optical characteristics and electric characteristics needed for the above-mentioned touch panel having a high aperture ratio.

However, as disclosed in Japanese Patent Application Laid-Open No. 2013-222123, then the touch sensor including the low-reflection wiring of aluminum (Al) is formed on the substrate on the assumption that a step of forming the color filter on the opposite surface of the substrate is subsequently performed, an alkaline developing solution and a resist stripping agent used in a step of developing the color filter damages a metal portion functioning as a connection terminal portion of an opening on the wiring of the touch panel, resulting in occurrence of faulty connections between the connection terminal portion and the wiring.

In contrast, on the assumption that the color filter is formed on the substrate first and the step of forming the touch panel structure, as disclosed in Japanese Patent Application Laid-Open No. 2013-222123, is subsequently performed, the color filter is already formed on the lower surface of the substrate when the touch panel structure is formed. Thus, the color filter is scratched during a stage adsorption and a transfer when being exposed to light in the step of forming the touch panel structure, thereby reducing yields.

SUMMARY OF THE INVENTION

It is an object of the present invention to obtain a touch sensor layer without performance degradation in a touch panel structure including a color filter layer, the touch sensor layer including laminated wiring having characteristics of a low resistance and a low reflectance.

A touch panel structure of the present invention includes: a substrate having one main surface and the other main surface; a touch sensor layer that is located on the one main surface of the substrate and includes a display region and a lead-out wiring region including an external terminal portion for external connection; and a color filter layer located on the other main surface of the substrate.

The color filter layer is formed so as to overlap the display region of the touch sensor layer in plan view. The touch sensor layer includes: laminated wiring formed by a conductive film, a low-reflection film, and a transparent film laminated in the stated order; an insulating film formed to cover the laminated wiring; and an opening that is selectively formed in the lead-out wiring region, penetrates the insulating film and the transparent film, and has a surface of the low-reflection film uncovered as a bottom surface. The external terminal portion is formed by the low-reflection film and the conductive film below the bottom surface of the opening.

The external terminal portion in the touch panel structure of the present invention includes the low-reflection film formed on the conductive film in the final structure, and at least the low-reflection film is in the upper layer when a TFT array substrate is combined to manufacture a display apparatus, thereby having no influence on the conductive film in the lead-out wiring region.

A method for manufacturing a touch panel structure of the present invention includes the steps (a) to (d). The step (a) prepares a substrate having one main surface and the other main surface, the step (b) forms a main portion of a touch sensor layer on the one main surface of the substrate, the touch sensor layer having a display region and a lead-out wiring region, and the step (c) forms a color filter layer on the other main surface of the substrate after performing the step (b). The color filter layer is formed so as to overlap the display region of the touch sensor layer in plan view. The step (d) forms an external terminal portion for external connection in the lead-out wiring region after performing the step (c).

The step (b) includes the steps (b-1) to (b-3). The step (b-1) forms laminated wiring including a conductive film, a low-reflection film, and a transparent film laminated in the stated order on the substrate, the step (b-2) forms an insulating film that covers the laminated wiring, and the step (b-3) selectively forms a halfway opening in the lead-out wiring region, the halfway opening penetrating the insulating film and having a surface of the transparent film uncovered as a bottom surface.

The step (d) includes the step of (d-1) forming a final opening that penetrates at least the transparent film on the bottom surface of the halfway opening, the external terminal portion including at least the conductive film below a bottom surface of the final opening.

In the method for manufacturing a touch panel structure of the present invention, the transparent film and the low-reflection film remain on the bottom surface of the halfway opening in the lead-out wiring region immediately after performing the step (b), so that when the color filter layer is formed in the step (c) performed after the step (b), the conductive film and the low-reflection film in the lead-out wiring region are not influenced.

The step (d) performed after the step (c) removes at least the transparent film that is subjected to a processing environment in the step (c) and is formed immediately below the bottom surface of the final opening, to thereby form the external terminal portion including at least the conductive film.

As a result, a material such as aluminum having a low resistance can be selected for the conductive film formed in the step (b-1), and the touch panel structure in which the touch sensor layer formed of the laminated wiring having the low resistance is formed without performance degradation can eventually be manufactured.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 5 to 23 are cross-sectional views showing the method for manufacturing the CF-equipped touch panel substrate in the first preferred embodiment;

FIGS. 25 and 26 are cross-sectional views showing a method for manufacturing a CF-equipped touch panel substrate in the second preferred embodiment; and FIG. 27 is a cross-sectional view showing a cross-sectional structure of a CF-equipped touch panel substrate in the prior invention.

DESCRIPTION OF THE PREFERRED EMBODIMENTS

<Overall Configuration of Display Apparatus>

Figure 1:
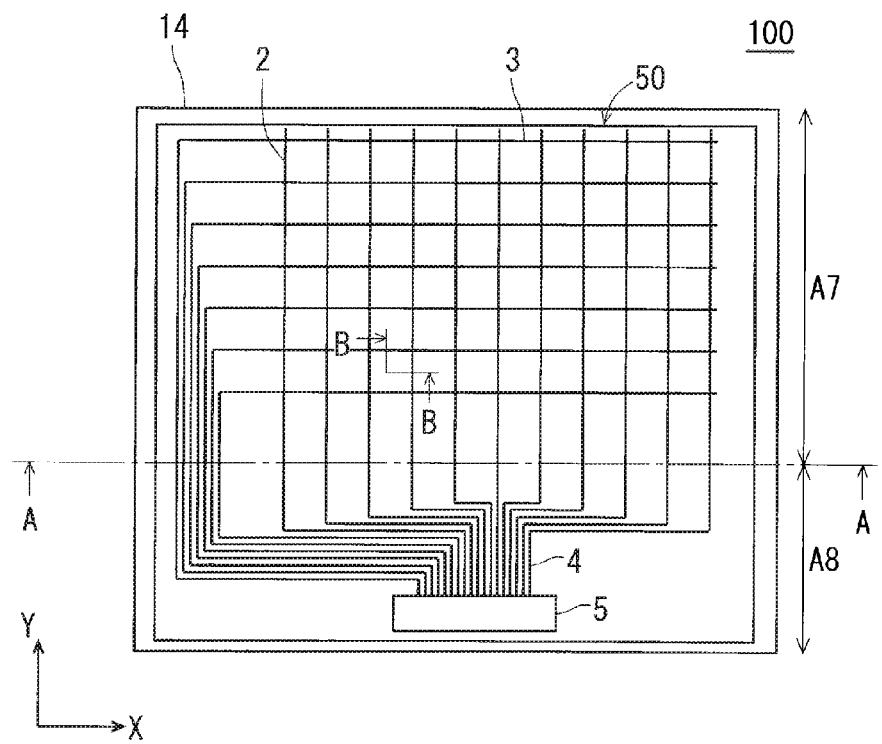
FIG. 1 is a plan view showing an overall configuration of a display apparatus in a first preferred embodiment and a second preferred embodiment of the present invention.
Figure 2:
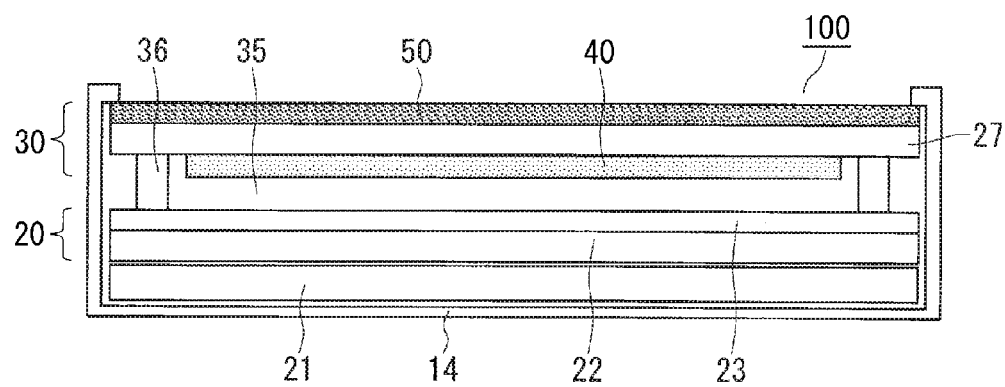
FIG. 2 is a cross-sectional view showing an A-A section in FIG. 1.

FIG. 1 is a plan view showing an overall configuration common to display apparatuses in a first preferred embodiment and a second preferred embodiment of the present invention. FIG. 2 is a cross-sectional view showing an A-A section in FIG. 1. FIG. 1 shows an XY orthogonal coordinate system.

A display apparatus 100 shown in FIGS. 1 and 2 allows an input with a touch panel, which is premised on outdoor use, and the display apparatus 100 has a pointing function with a finger or the like.

As shown in FIG. 2, the display apparatus 100 is formed as a liquid crystal display panel and has a laminated structure of a backlight unit 21, a TFT array substrate 20, a liquid crystal portion 35, a sealing material 36 for the liquid crystal portion 35, and a color-filter (CF)-equipped touch panel substrate 30 in a housing 14. The CF-equipped touch panel substrate 30 includes a CF equipped touch panel substrate 30A in the first preferred embodiment described below and a CF-equipped touch panel substrate 30B in the second preferred embodiment.

The TFT array substrate 20 includes a TFT array layer 23 formed on a transparent substrate 22. Meanwhile, the CF-equipped touch panel substrate 30 includes a transparent substrate 27 (substrate), a touch sensor layer 50 formed on one main surface (upper surface in the diagram) of the transparent substrate 27, and a color filter layer 40 formed on the other main surface (lower surface in the diagram) of the transparent substrate 27. The CF-equipped touch panel substrate 30 having such configuration is used to be combined with a display module forming a graphical user interface (GUI) device, and thus the display apparatus 100 can have the pointing function. In addition, the display module includes the liquid crystal portion 35, the TFT array substrate 20, or the like.

The CF-equipped touch panel substrate 30 being a projected capacitive touch panel is formed on the transparent substrate 27 made of glass or polyethylene terephthalate (PET). The CF-equipped touch panel substrate 30 includes X position detecting wires 2 and Y position detecting wires 3. The X position detecting wires 2 are disposed to extend in a column direction (Y direction (first direction) in FIG. 1), and the Y position detecting wires 3 are disposed above the X position detecting wires 2 while extending in a row direction (X direction in FIG. 1) so as to intersect the X position detecting wires 2 three-dimensionally. In other words, the row direction being a second direction is perpendicular to the column direction being the first direction and intersects the column direction in plan view. In this manner, the touch sensor layer 50 includes matrix wiring formed by the X position detecting wires 2 and the Y position detecting wires 3.

As shown in FIG. 1, the X position detecting wires 2 and the Y position detecting wires 3 are electrically connected to a (connection) terminal portion 5 at an edge portion (lower portion in the diagram) of the CF-equipped touch panel substrate 30 through lead-out wires 4, the terminal portion 5 inputting and outputting signals from and to the outside. The CF-equipped touch panel substrate 30 is electrically connected to a control substrate, which is not shown, through the terminal portion 5 for the external connection.

In the first preferred embodiment described below and the second preferred embodiment, the X position detecting wires 2 are described as lower-layer wires (on the transparent substrate 27 side) while the Y position detecting wires 3 are described as upper-layer wires (on a polarizing plate 66 side described below), but the X position detecting wires 2 and the Y position detecting wires 3 may be disposed vice versa in the upper and lower relation.

First Preferred Embodiment

Figure 3:
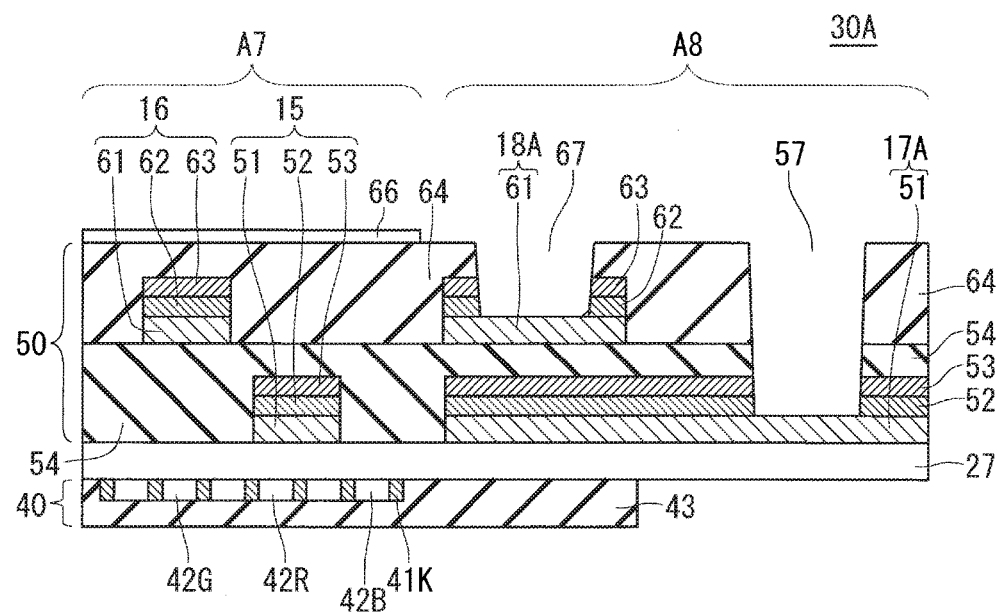
FIG. 3 is a cross-sectional view showing a B-B section in FIG. 1 and a cross-sectional configuration of a lead-out wiring region for X position detecting wires and Y position detecting wires in the first preferred embodiment.

Hereinafter, with reference to the cross-sectional structure of the display apparatus 100, the CF-equipped touch panel substrate 30A (touch panel structure) in the first preferred embodiment of the present invention is described. FIG. 3 is a cross-sectional view showing a B-B section in a display region A7 in FIG. 1 and a cross-sectional structure of the first preferred embodiment in which each terminal portion in a lead-out wiring region A8 for the X position detecting wires 2 and the Y position detecting wires 3 is extracted and abstract.

As shown in FIG. 3, the touch sensor layer 50 includes a low-resistance conductive film 51 (first conductive film) selectively formed, a low-reflection film 52 (first low-reflection film) on the low-resistance conductive film 51, and a transparent cap film 53 (first transparent film) on the low-reflection film 52 on the surface (one main surface) of the transparent substrate 27 made of glass or PET in the display region A7. A lower-layer wire 15 (first laminated wiring) has a laminated structure formed by the low-resistance conductive film 51, the low-reflection film 52, and the transparent cap film 53 laminated in the stated order.

An interlayer insulating film 54 (first insulating film) is formed so as to cover the lower-layer wire 15. The lower-layer wire 15, as shown in FIG. 3, formed of the low-resistance conductive film 51, the low-reflection film 52, and the transparent cap film 53 in the display region A7 corresponds to one of the X position detecting wires 2 shown in FIG. 1. It can be said that the transparent substrate 27 is an underlying layer for forming the lower-layer wire 15, so that the transparent substrate 27 may also be referred to as an underlying layer.

Further, a low-resistance conductive film 61 (second conductive film) is selectively formed on the interlayer insulating film 54, a low-reflection film 62 (second low-reflection film) is formed on the low-resistance conductive film 61, and a transparent cap film 63 (second transparent film) is formed on the low-reflection film 62. An upper-layer wire 16 (second laminated wiring) has a laminated structure formed by the low-resistance conductive film 61, the low-reflection film 62, and the transparent cap film 63 laminated in the stated order.

A protective insulating film 64 (second insulating film) is formed so as to cover the upper-layer wire 16. The upper-layer wire 16 corresponds to one of the Y position detecting wires 3 shown in FIG. 1. It can be said that the interlayer insulating film 54 is an underlying layer for forming the upper-layer wire 16, so that the interlayer insulating film 54 may also be referred to as an underlying layer.

Meanwhile, a contact hole 57 (opening) is formed in the lead-out wiring region A8 while penetrating the protective insulating film 64, the interlayer insulating film 54, the transparent cap film 53, the low-reflection film 52 and having the surface of the low-resistance conductive film 51 uncovered as a bottom surface. A lower-layer terminal portion 17A (first external terminal portion) is formed by only the low-resistance conductive film 51 on the bottom surface of the contact hole 57.

Similarly, a contact hole 67 (opening) is formed in the lead-out wiring region A8 while penetrating the protective insulating film 64, the transparent cap film 63, and the low-reflection film 62 and having the surface of the low-resistance conductive film 61 uncovered as a bottom surface. An upper-layer terminal portion 18A (second external terminal portion) is formed by only the low-resistance conductive film 61 on the bottom surface of the contact hole 67.

In FIG. 1, the lower-layer terminal portion 17A corresponds to part of the (connection) terminal portion 5 that extends from the lower-layer wire 15 (=X position detecting wire 2) and is electrically connected to the lower-layer wire 15 through the lead-out wire 4 while the upper-layer terminal portion 18A corresponds to part of the terminal portion 5 that extends from the upper-layer wire 16 (=Y position detecting wire 3) and is electrically connected to the upper-layer wire 16 through the lead-out wire 4.

The low-resistance conductive film 51 for the lower-layer wire 15 and the lower-layer terminal portion 17A is made of an alloy of Al system being a low-resistance material, such as AlNiNd, and has a thickness of 300 nm, for example.

The low-reflection film 52 for the lower-layer wire 15 and the lower-layer terminal portion 17A is made of an aluminum (Al) nitride film and has a thickness of 50 nm, for example, the Al nitride film having a high degree of nitriding of 30 to 50 at % (atomic %) in terms of a composition ratio of nitrogen, for example.

The Al nitride film can have a reflectance of 50% or less by appropriately selecting the degree of nitriding on condition that the degree of nitriding is 30 to 50 at % in terms of the composition ratio of nitrogen. For example, the Al nitride film can have a reflectance of 30% or less by having the degree of nitriding of approximately 45 at % in terms of the composition ratio of nitrogen. As the Al nitride film has a thick thickness, a reflectance can decrease, but it is technically difficult to form the thick thickness with great precision. Thus, as described above, setting the degree of nitriding and adjusting the thickness according to the degree of nitriding can obtain an optimum low-reflection film 52.

The transparent cap film 53 for the lower-layer wire 15 and the lower-layer terminal portion 17A is made of indium tin oxide (ITO), for example, and has a thickness of 50 nm, for example.

The interlayer insulating film 54 is made of $SiO_2$, for example, and has a thickness of 600 nm, for example.

The low-resistance conductive film 61 for the upper-layer wire 16 and the upper-layer terminal portion 18A is made of an alloy of Al system being a low-resistance material, such as AlNiNd, and has a thickness of 400 nm, for example.

The low-reflection film 62 for the upper-layer wire 16 and the upper-layer terminal portion 18A is made of an Al nitride film and has a thickness of 50 nm, for example, the Al nitride film having a high degree of nitriding of 30 to 50 at % (atomic %) in terms of a composition ratio of nitrogen, for example.

As described above, the Al nitride film being the material for the low-reflection films 52 and 62 can have the reflectance of 50% or less by appropriately selecting the degree of nitriding on condition that the degree of nitriding is 30 to 50 at % in terms of the composition ratio of nitrogen. For example, the Al nitride film can have the reflectance of 30% or less by having the degree of nitriding of approximately 45 at % in terms of the composition ratio of nitrogen. Adjusting the thickness according to the degree of nitriding can obtain an optimum low-reflection film.

The transparent cap film 63 for the upper-layer wire 16 and the upper-layer terminal portion 18A is made of ITO, example, and has a thickness of 50 nm, for example.

The protective insulating film 64 is made of $SiO_2$, for example, and has a thickness of 300 nm, for example.

As described above, in the lead-out wiring region A8, the low-resistance conductive film 51 remains on the bottom surface of the contact hole 57, the lower-layer terminal portion 17A is formed by only the low-resistance conductive film 51, the low-resistance conductive film 61 remains on the bottom surface of the contact hole 67, and the upper-layer terminal portion 18A is formed by only the low-resistance conductive film 61.

The color filter layer 40 is formed on the back surface (the other main surface) of the transparent substrate 27 opposite to the surface on which the touch sensor layer 50 is formed. The color filter layer 40 is formed in such a position as to overlap the display region A7 of the touch sensor layer 50 in plan view in the XY plane of FIG. 1.

In the first preferred embodiment, the example in which the low-reflection films 52 and 62 are made of the Al nitride film (AlN film) is described, but this is not restrictive. The low reflection films 52 and 62 may be made of metal (nitride metal) being a nitrided alloy of the Al system containing Al as a main component to which the other metals are added. The other metals include Fe, Co, Ni being Group 8 transition metals and Nd being a rare-earth element, for example.

In the first preferred embodiment described above, the upper-layer wire 16 being the Y position detecting wire 3 that extends in the row direction (X direction) in the display region A7 of the horizontal shape has a wiring length longer than that of the lower-layer wire 15 being the X position detecting wire 2 that extends in the column direction (Y direction), so that the low-resistance conductive film 61 has a thickness greater than that of the low-resistance conductive film 51 to reduce a wiring resistance. However, a thickness of the low-resistance conductive film 51 of the lower-layer wire 15 and a thickness of the low-resistance conductive film 61 of the upper-layer wire 16 may be freely determined by a necessary resistance.

In the first preferred embodiment, the example in which the low-resistance conductive films 51, 61 are made of the alloy of the Al system is described, but this is not restrictive. The low-resistance conductive films 51 and 61 may be made of Ag, for example.

The CF-equipped touch panel substrate 30A in the first preferred embodiment has the effect of reducing variations in a reflection distribution by suppressing, to approximately {minimum thickness/maximum thickness>0.6}, a thickness distribution of set thicknesses of the low-reflection films 52 and 62 at completion of a process.

The thicknesses of the interlayer insulating film 54 and the protective insulating film 64 may be freely determined by a desired capacitance or the like and may be determined by a selection ratio to a resist film in a dry etching process and by a process time. The thicker thickness often reduces a shade and a difference in reflectance between the interlayer insulating film 54 or the protective insulating film 64 and the lower-layer wire, so that the thickness is set around 1 μm and is preferably set to 1.3 μm or more.

FIGS. 4 to 23 are cross-sectional views showing a method for manufacturing the CF-equipped touch panel substrate 30A (touch panel structure) in the first preferred embodiment in the display apparatus 100 shown in FIGS. 1 to 3. Hereinafter, with reference to the drawings, the method for manufacturing the CF-equipped touch panel substrate 30A is described.

Figure 4:
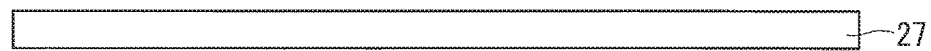
FIG. 4 is a cross-sectional view showing a method for manufacturing a CF-equipped touch panel substrate in the display apparatus in the first preferred embodiment of the present invention.
Figure 5:
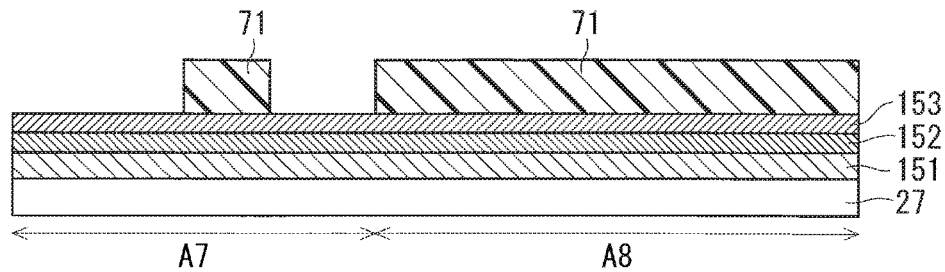

First, after the transparent substrate 27 made of glass or PET is prepared as shown in FIG. 4, an AlNiNd film 151 having a thickness of 300 nm is formed using an AlNiNd target by sputtering as shown in FIG. 5. Then, the same device for forming a film is used, and an Al alloy nitride film 152 that is a metal nitride film having a high degree of nitriding and that has a thickness of 50 nm is formed on the AlNiNd film 151 using the AlNiNd target by sputtering in an atmosphere of $N_2$ gas.

For a low degree of nitriding, the Al alloy nitride film 152 is a reflection film and fails to be a low-reflection film, and for a high degree of nitriding, the Al alloy nitride film 152 is a transparent film and fails to be a low-reflection film. Thus, a relationship between a partial pressure of $N_2$ and reflection characteristics in the device for forming a film being used needs to be obtained in advance, and it is preferable to determine conditions for forming a film so as to obtain a low-reflection film having a desired reflectance.

Furthermore, as shown in FIG. 5, an amorphous indium tin oxide (ITO) film 153 having a thickness of 50 nm is formed on the Al alloy nitride film 152 by sputtering. In addition, a means such as coating may be used instead of sputtering.

Next, as shown in FIG. 5, after a resist material is applied to the ITO film 153, a pattern for the lower-layer wire 15 is exposed to light and developed, to thereby form a resist (mask) 71 patterned for the lower-layer wire 15 (as well as the lower-layer terminal portion 17A and the lead-out wire extending to the lower-layer terminal portion 17A).

Figure 6:
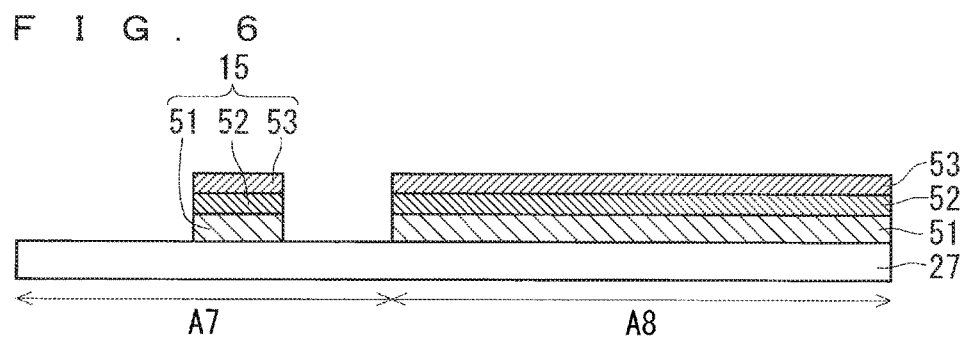

Next, as shown in FIG. 6, the ITO film 153 is etched with, for example, oxalic acid using the resist 71 that has been patterned as an etching mask, to thereby obtain the transparent cap film 53 patterned. Then, the Al alloy nitride film 152 and the AlNiNd film 151 are etched with, for example, a mixed acid of phosphoric acid, nitric acid, and acetic acid using the resist 71 and the transparent cap film 53 as etching masks, to thereby obtain the low-reflection film 52 and the low-resistance conductive film 51 patterned.

When the Al alloy nitride film 152 and the AlNiNd film 151 are simultaneously etched, a degree of nitriding of the Al alloy nitride film 152 is set within a range that allows etching with the mixed acid.

Next, the resist 71 is removed by using a resist stripping agent such as a mixed solution of, for example, monoethanolamine and dimethyl sulfoxide. Thus, as shown in FIG. 6, the lower-layer wire 15 formed of the low-resistance conductive film 51, the low-reflection film 52, and the transparent cap film 53 is formed in the display region A7, and the structure in the prior stage of the lower-layer terminal portion 17A formed of the low-resistance conductive film 51, the low-reflection film 52, and the transparent cap film 53 is formed in the lead-out wiring region A8.

Figure 7:
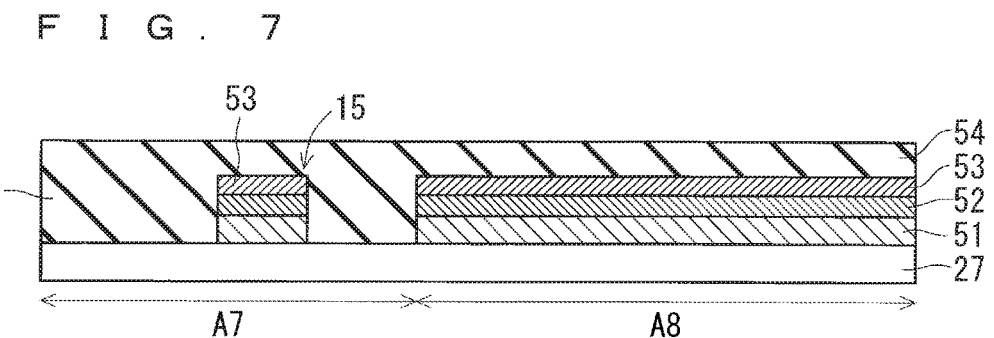

Next, as shown in FIG. 7, an $SiO_2$ film is formed by, for example, chemical vapor deposition (CVD) so as to cover the entire surface including the lower-layer wire 15, to thereby form the interlayer insulating film 54 having the thickness of 600 nm.

Figure 8:
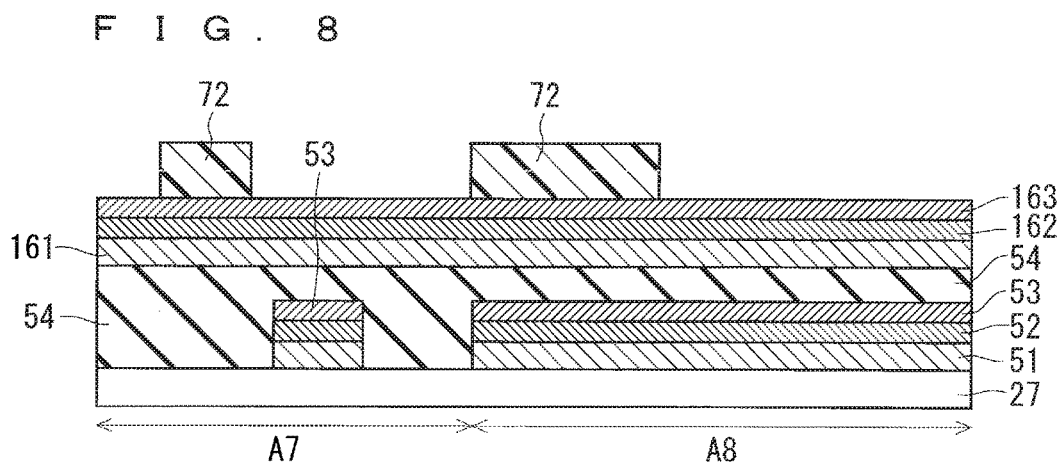

Next, the upper-layer wire 16 is formed on the interlayer insulating film 54. First, as shown in FIG. 8, an AlNiNd film 161, an Al alloy nitride film 162 (metal nitride film), and an ITO film 163 are successively laminated similarly to the formation of the AlNiNd film 151, the Al alloy nitride film 152, and the ITO film 153. Then, after the resist material is applied to the ITO film 163, a pattern for the upper-layer wire 16 (including the upper-layer terminal portion 18A and the lead-out wire extending from the upper-layer wire 16 and the upper-layer terminal portion 18A) is exposed to light and developed, to thereby form a resist (mask) 72 patterned for the upper-layer wire 16.

Figure 9:
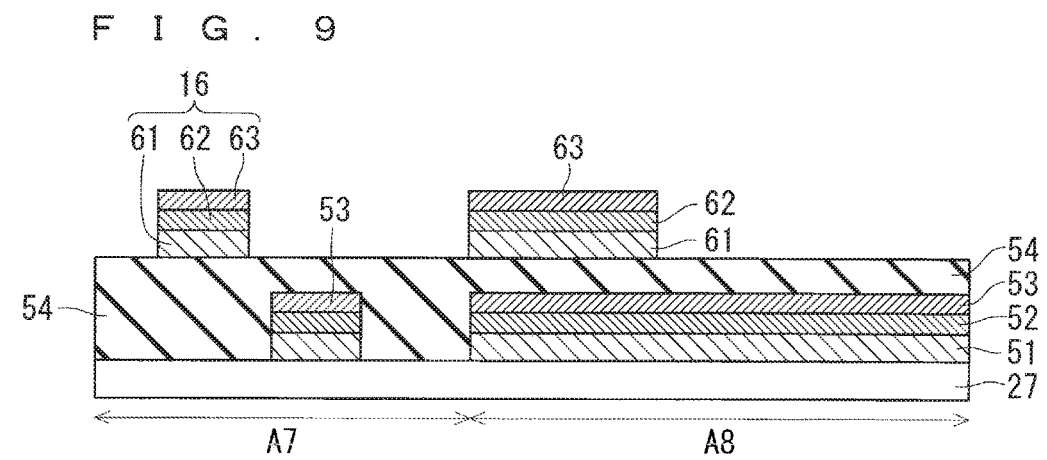

Next, as shown in FIG. 9, similarly to the formation of the lower-layer wire 15, the ITO film 163 is etched using the resist 72 that has been patterned as an etching mask, to thereby obtain the transparent cap film 63 patterned. Then, the Al alloy nitride film 162 and the AlNiNd film 161 are etched using the resist 72 and the transparent cap film 63 as etching masks, to thereby obtain the low-reflection film 62 and the low-resistance conductive film 61 that are patterned. Subsequently, the resist 72 is removed similarly to the resist 71.

As a result, as shown in FIG. 9, the upper-layer wire 16 formed of the low-resistance conductive film 61, the low-reflection film 62, and the transparent cap film 63 is formed in the display region A7, and the structure in the prior stage of the upper-layer terminal portion 18A formed of the low-resistance conductive film 61, the low-reflection film 62, and the transparent cap film 63 is formed in the lead-out wiring region A8.

After the upper-layer wire 16 is formed, the $SiO_2$ film is formed by, for example, the CVD so as to cover the entire surface including the upper-layer wire 16 as shown in FIG. 10, to thereby form the protective insulating film 64 having a thickness of 300 nm.

Next, as shown in FIG. 11, after the resist material is applied to the protective insulating film 64, a pattern is exposed to light and developed in the lead-out wiring region A8 in which the terminal portion 5 (see FIG. 1) is formed, to thereby obtain a resist (mask) 73 patterned for the lower-layer terminal portion 17A and the upper-layer terminal portion 18A.

Next, as shown in FIG. 12, the protective insulating film 64 and the interlayer insulating film 54 are etched by, for example, dry etching using the resist 73 as an etching mask, to thereby obtain a contact hole 67L (halfway opening) and a contact hole 57L (halfway opening) in the lead-out wiring region A8. The contact hole 67L penetrates the protective insulating film 64 and exposes the surface of the transparent cap film 63. The contact hole 57L penetrates the protective insulating film 64 and the interlayer insulating film 54 and exposes the surface of the transparent cap film 53.

Figure 13:
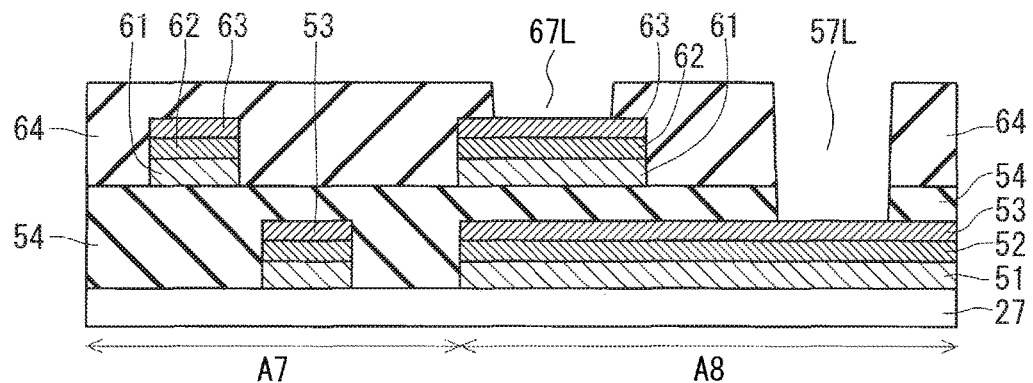

Next, as shown in FIG. 13, the resist 73 is removed by using a resist stripping agent such as the mixed solution of, for example, monoethnolamine and dimethyl sulfoxide, to thereby leave the halfway openings being the contact holes 57L and 67L. As a result, a main portion of the touch sensor layer 50 except for the lower-layer terminal portion 17A and the upper-layer terminal portion 18A is completed.

The descriptions up to this point omit the following description. A material having a refractivity of approximately 1.7 to 2.4, for example, which is higher than that of the interlayer insulating film 54 and the protective insulating film 64, is selected for the transparent cap films 53 and 63 for the lower-layer wire 15 and the upper-layer wire 16, respectively, and the films have a thickness of 30 nm to 70 nm to set an optical path length L to 0.05 to 0.17 μm, so that reflectances of the laminated wiring can be further reduced.

For example, a reflection intensity Y is 15.0 in a case where an $SiO_2$ film that has a thickness of 1000 nm and serves as the interlayer insulating film 54 (protective insulating film 64) is formed on the laminated film of the Al alloy nitride film 152 (162) and the AlNiNd film 151 (161), and the $SiO_2$ film is irradiated with a standard illuminant D65. On the other hand, a reflection intensity Y is 6.7 in a case where an IZO film that has a reflectance of 1.68 to 2.10 and a thickness of 50 nm and serves as the transparent cap film 53 (63) remaining on the low-reflection film 52 (62). In addition, the standard illuminant D65 is a light source used for evaluating a reflection intensity of a film.

Examples of a well-known method for forming an Al alloy nitride film having a low reflection include sputtering using gas containing nitrogen. When sputtering is used, a reflectance can be set by adjusting a mixing ratio of nitrogen gas. As the mixing ratio of nitrogen gas increases to reduce the reflectance, variations in a degree of nitriding in a plane of a low-reflection film increase and a reflection distribution in the plane increases. Therefore, when the degree of nitriding of the Al nitride film being the low-reflection film is increased, variations in the degree of nitriding in the plane of the low-reflection film increase and variations in the reflectance may also increase.

However, the lower-layer wire 15 and the upper-layer wire 16 have the laminated structures including the transparent cap film 53 and the transparent cap film 63, respectively, so that the degree of nitriding of the Al nitride films forming the low-reflection films 52 and 62 can be set low. This suppresses variations in the degree of nitriding in the planes of the low-reflection films 52 and 62, and thus the low-reflection wires having a uniform reflectance can be achieved. Moreover, the degree of nitriding of the low-reflection films 52 and 62 can be set low, so that the Al nitride films are easily etched, and a stable work process can be achieved. The effects described above can be similarly obtained in a case where the Al nitride films are replaced by Al alloy nitride films.

Examples of the material having the refractivity of approximately 1.7 to 2.4 for the transparent cap films 53 and 63 include transparent conductive films such as IZO, ITO, SnO, ZnO, and InO and transparent dielectric films such as SiN, $Al_2O_3$, transparent AlN (composition ratio of 1:1), TaO, NbO, and TiO.

The method for patterning the low-reflection films 52 and 62 and the low-resistance conductive films 51 and 61 using the resists 71 and 72 and the transparent cap films 53 and 63 as the resist masks is described above. However, the method is not restrictive, and when the transparent cap films 53 and 63 are formed of a material having high etching selectivity for the low-reflection films 52 and 62 and the low-resistance conductive films 51 and 61, the resists 71 and 72 are removed after the transparent cap films 53 and 63 are patterned, and the low-reflection films 52 and 62 and the low-resistance conductive films 51 and 61 may be patterned with the transparent cap films 53 and 63 that have been patterned as etching masks.

When the transparent cap films 53 and 63 are formed of a material having high etching selectivity for only the low-resistance conductive films 51 and 61, the resist masks are removed after the low-reflection films 52 and 62 are patterned, and the low-reflection films 52 and 62 may be patterned with the transparent cap films 53 and 63 that have been patterned as etching masks.

The first preferred embodiment described above shows the example in which the protective insulating film 64 and the interlayer insulating film 54 are formed of $SiO_2$, and an insulating film in which coloring of transmitted light in a light transmitting portion except for wiring portions (lower-layer wire 15, upper-layer wire 16) is insignificant may be used, and a spin-on-glass (SOG) film of a coating type, for example, may be used. The SOG film is used to form the interlayer insulating film 54, which can reduce the possibility of occurrence of a broken wire at an intersection of the upper-layer wire 16 and the lower-layer wire 15. The interlayer insulating film 54 is formed to have the laminated structure of $SiO_2$ films, SOG films, or the like, and thus withstand voltage of the interlayer insulating film 54 can be improved. In this case, the protective insulating film 64 is formed to have the laminated structure of $SiO_2$ films, SOG films, or the like, thereby increasing the hardness of a portion being a lower surface in a step of forming a color filter. This suppresses occurrence of defects such as a scratch, which is more favorable.

The insulating film in which coloring of transmitted light in the light transmitting portion except for the wiring portions is insignificant may be used, and the protective insulating film 64 and the interlayer insulating film 54 of a coating type may be formed of a photosensitive material, for example. In this case, the formation of the halfway openings being the contact holes 57L and 67L in the lead-out wiring region A8 can be replaced by application, light exposure, and development of the photosensitive interlayer insulating film. This eliminates the need for the dry etching step and the resist stripping step using the resist mask, so that the manufacturing process can be simplified, to thereby obtain the effect of suppressing a manufacturing cost.

Figure 14:
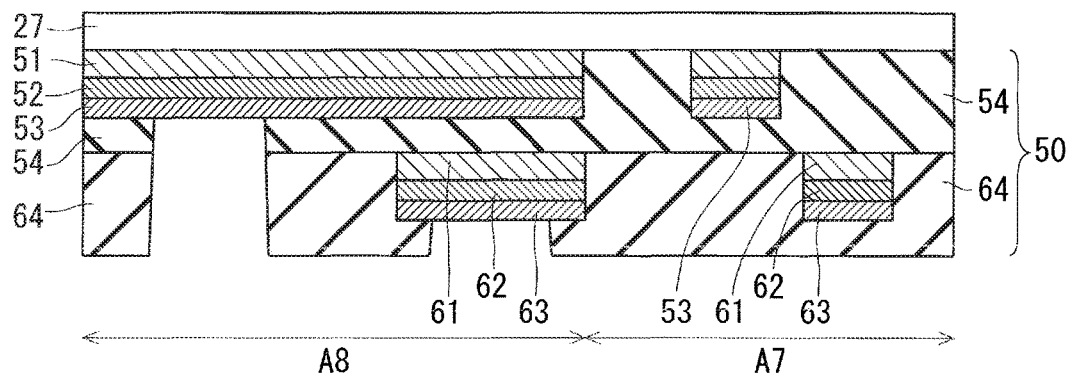

Next, with reference to FIGS. 14 to 23, a method for manufacturing the color filter layer 40 is described. First, as shown in FIG. 14, the structure shown in FIG. 13 is turned upside down such that the other main surface (hereinafter referred to as a "color filter forming surface") faces upward. The color filter forming surface is opposite to the touch panel forming surface being the one surface of the transparent substrate 27 including the touch sensor layer 50 formed thereon.

Figure 15:
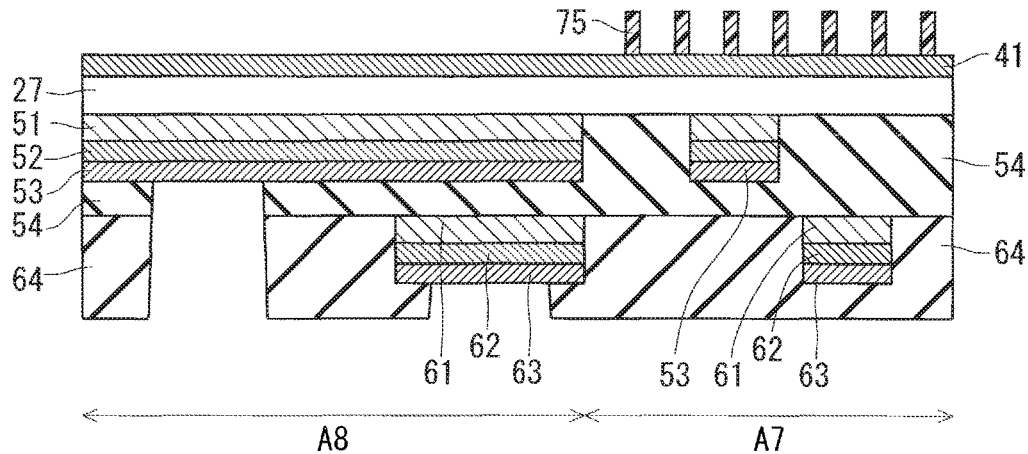

Next, as shown in FIG. 15, a Cr film 41 having a thickness of 300 nm is formed using a Cr target by sputtering, for example, to form a film for a black matrix layer 41l on the color filter forming surface of the transparent substrate 27. After a resist material is applied to the Cr film 41 for the black matrix layer, a pattern for the black matrix is exposed to light and developed, to thereby form a resist (mask) 75 patterned for the black matrix.

An alkaline developing solution is typically used for developing the resist 75, but the touch sensor layer 50 in the first preferred embodiment has a configuration in which the low-reflection film 52 and the transparent cap film 53 remain on the low-resistance conductive film 51 in the halfway opening being the contact hole 57L in the lead-out region A8 while the low-reflection film 62 and the transparent cap film 63 remain on the low-resistance conductive film 61 in the halfway opening being the contact hole 67L in the lead-out wiring region A8.

In this manner, the transparent cap films 53 being the uppermost layer on the bottom surface of the contact hole 57L protects the low-reflection film 52 and the low-resistance conductive film 51 being the lower layers while the transparent cap film 63 being the uppermost layer on the bottom surface of the contact hole 67L protects the low-reflection film 62 and the low-resistance conductive film 61 being the lower layers. For this reason, when a material such as aluminum is used for the low-resistance conductive films 51 and 61 of the wiring (the lower-layer wire 15 and the upper-layer wire 16) of the touch panel, and in addition to that, a material such as the Al nitride film is used for the low-reflection films 52 and 62, damage to the materials by the alkaline developing solution and the resist stripping agent can be reliably prevented. The damage conceivably includes, for example, corrosion of Al components forming the low-resistance conductive films 51 and 61 or the low-reflection films 52 and 62 by the alkaline developing solution and the resist stripping agent.

In the first preferred embodiment, the touch sensor layer 50 has been already formed on the touch panel forming surface of the transparent substrate 27 when the color filter layer 40 is formed. However, the interlayer insulating film 54 and the protective insulating film 64 formed of the material having hardness such as $SiO_2$ are formed on the surface of the touch sensor layer 50, which can reduce defects such as a scratch on the touch sensor layer 50 in a step of vacuum adsorption to a stage or by contact with an arm during transfer when the touch sensor layer 50 is exposed to light while the color filter layer 40 is formed.

Figure 16:
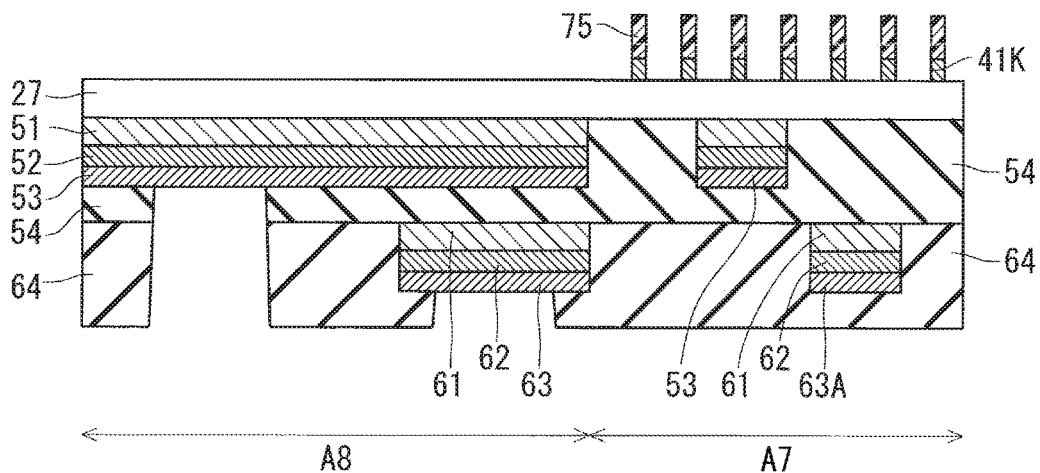

Next, as shown in FIG. 16, the Cr film 41 is etched with, for example, a solution containing ceric ammonium nitrate as a main component using the resist 75 as an etching mask, to thereby obtain the black matrix layer 41K patterned.

Figure 17:
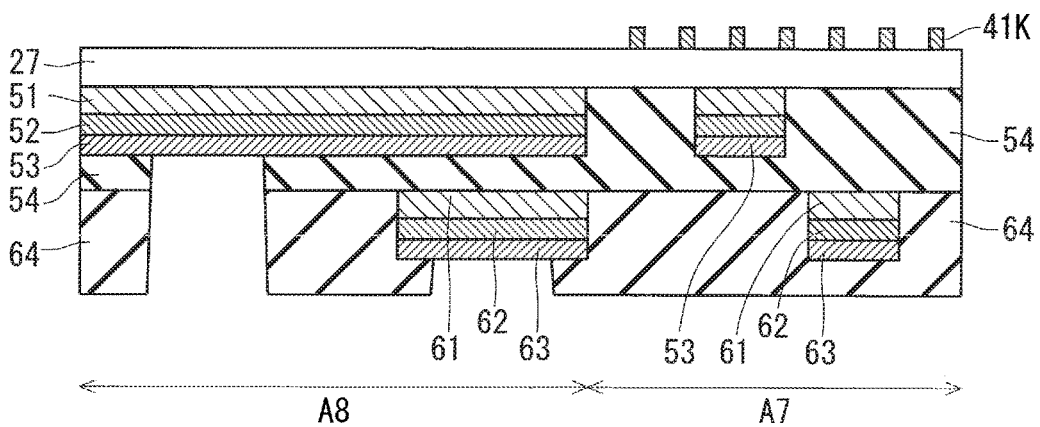

Next, as shown in FIG. 17, the resist 75 is removed by using a resist stripping agent such as a mixed solution of, for example, monoethnolamine and dimethyl sulfoxide, to thereby complete the black matrix layer 41K.

The resist stripping agent being the mixed solution of monoethnolamine and dimethyl sulfoxide is typically used to strip off the resist 75, but the touch sensor layer 50 in the first preferred embodiment has a configuration in which the low-reflection film 52 and the transparent cap film 53 are disposed in the halfway opening being the contact hole 57L in the lead-out wiring region A8 while the low-reflection film 62 and the transparent cap film 63 are disposed in the halfway opening being the contact hole 67L in the lead-out wiring region A8.

Therefore, the transparent cap film 53 being the uppermost layer protect the low-reflection film 52 and the low-resistance conductive film 51 being the lower layers while the transparent cap film 63 being the uppermost layer protect the low-reflection film 62 and the low-resistance conductive film 61 being the lower layers. For this reason, when a material such as aluminum is used for the low-resistance conductive films 51 and 61 of the wiring (the lower-layer wire 15 and the upper-layer wire 16) of the touch panel, and in addition to that, a material such as the Al nitride film is used for the low-reflection films 52 and 62, damage to the materials by the resist stripping agent can be reliably prevented. The damage conceivably includes, for example, corrosion of Al components forming the low-resistance conductive films 51 and 61 or the low-reflection films 52 and 62 by the resist stripping agent.

Figure 18:
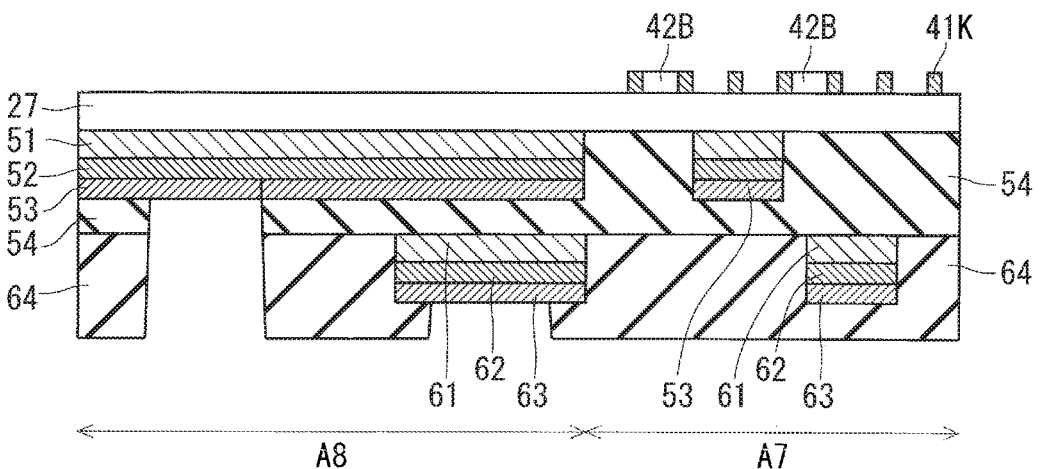

Next, as shown in FIG. 18, a color material such as a blue photosensitive material is applied, exposed to light using a light exposure mask of a blue pixel pattern, and developed, to thereby form a color material portion 42B of the blue pixel pattern. At this time, the color material portion 42B is formed so as to overlap the black matrix layer 41K within the appropriate range to prevent leakage of light. The alkaline developing solution is also used at the time of developing the color materials, and corrosion of the low-resistance conductive films 51 and 61 can be suppressed because the low-reflection film 52 and the transparent cap film 53 remain on the low-resistance conductive film 51 in the halfway opening being the contact hole 57L in the lead-out wiring region A8 while the low-reflection film 62 and the transparent cap film 63 remain on the low-resistance conductive film 61 in the halfway opening being the contact hole 67L in the lead-out wiring region A8.

Figure 19:
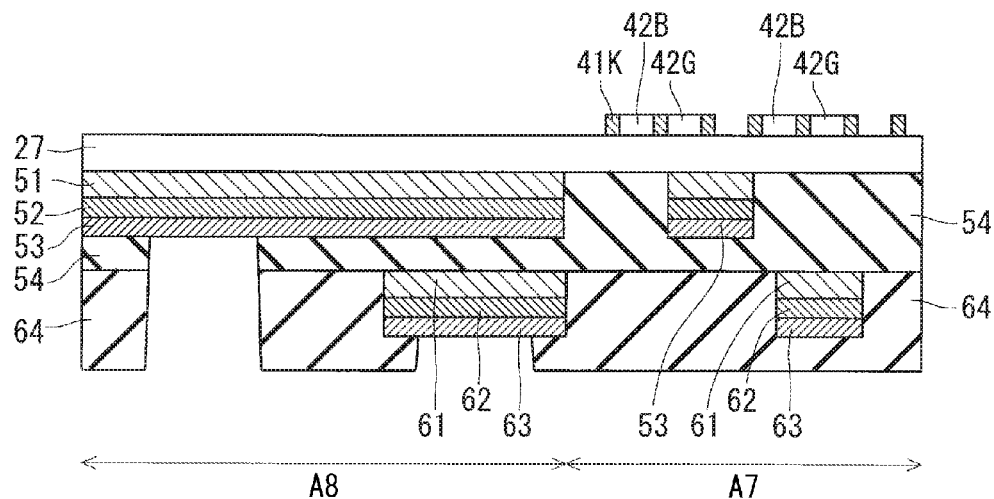
Figure 20:
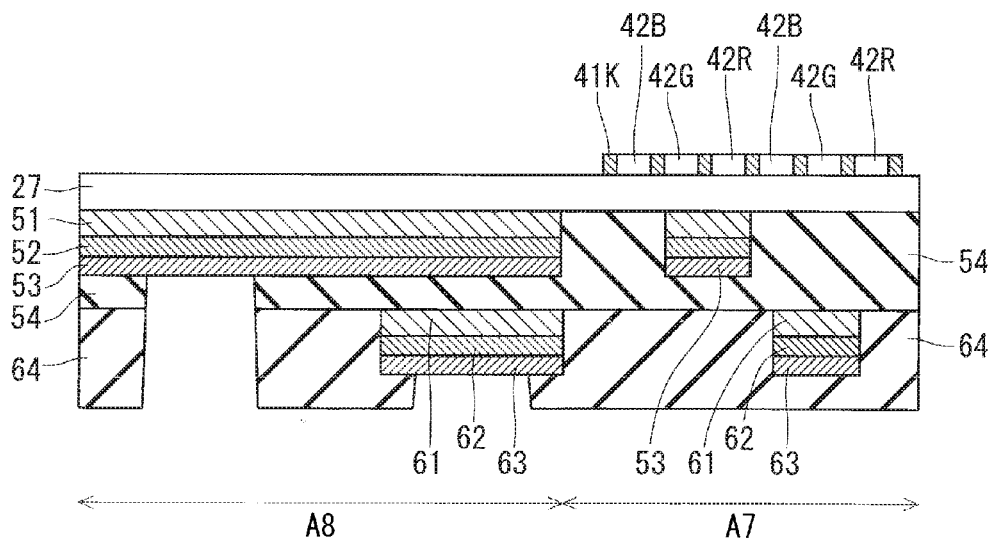

Subsequently, as shown in FIGS. 19 and 20, a color material portion 42G of a green pixel pattern and a color material portion 42R of a red pixel pattern are formed similarly to the formation of the color material portion 42B.

Figure 21:
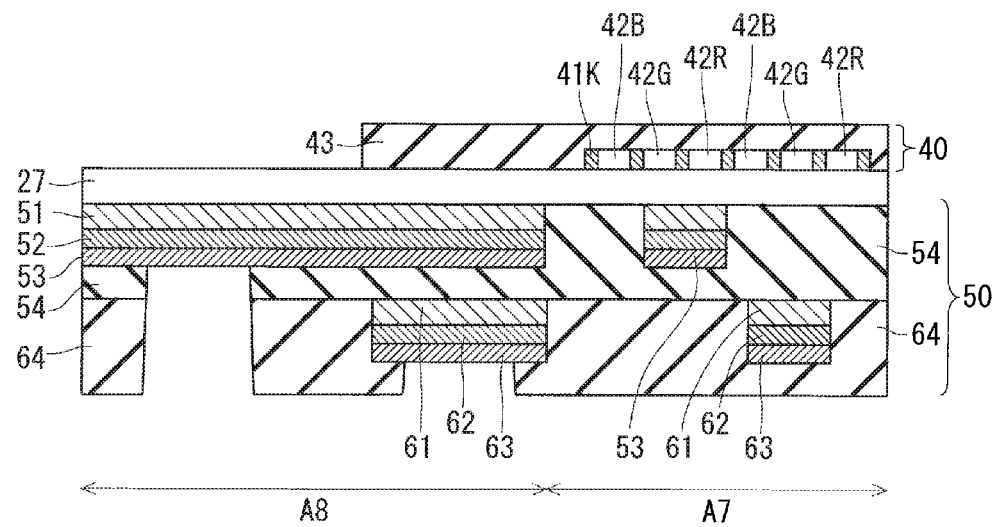

Subsequently, as shown in FIG. 21, an overcoat layer 43 is formed so as to cover the black matrix layer 41K and the color material portions 42R, 42G, 42B, to thereby complete the color filter layer 40. At this time, the color filter layer 40 is formed in a region that overlaps the display region A7 of the touch sensor layer 50 in plan view. In addition, the formation of the overcoat layer 43 may be omitted as necessary.

The example of the step of forming the color filter layer 40 is described above, and a color filter layer except for the color filter layer 40 formed in the above-mentioned step may be formed. For example, a color filter layer may develop a color by interference colors instead of the color filter layer including the color materials. The method for forming the color filter layer 40 described above includes the metal film as the black matrix layer 41K, but a metal oxide film (for example, chrome oxide) or a resin black matrix material may be used as a black matrix material to form the color filter layer 40.

Figure 22:
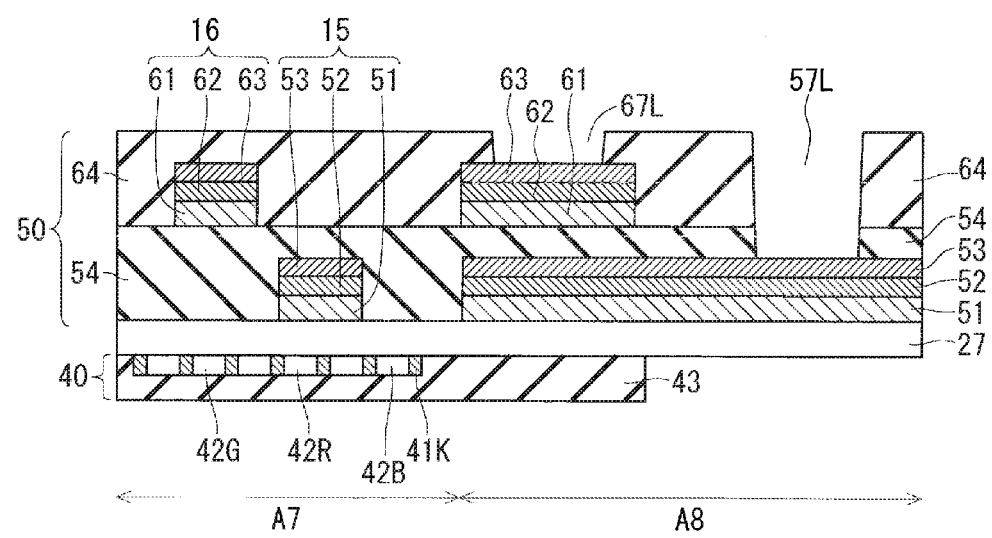

After the color filter layer 40 is formed, the structure shown in FIG. 21 is turned upside down such that the touch panel forming surface faces upward as shown in FIG. 22.

Figure 23:
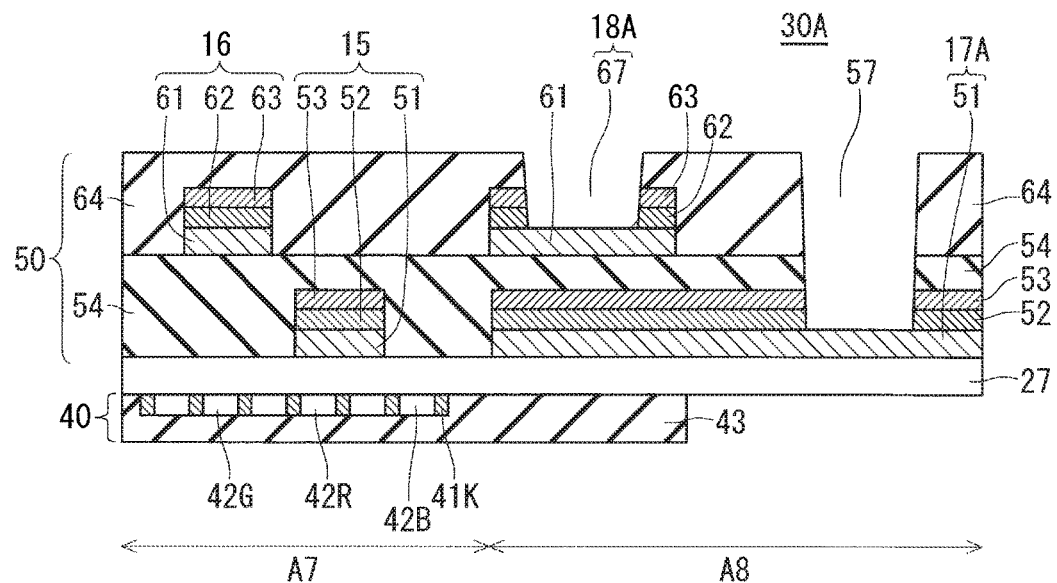

Then, as shown in FIG. 23, the transparent cap films 53 and 63 uncovered on the bottom surfaces of the halfway openings being the contact holes 57L and 67L are removed, and furthermore, the low-reflection films 52 and 62 uncovered after the removal of the transparent cap films 53 and 63 are also removed, to thereby obtain the openings (final openings) being the contact holes 57 and 67 that have the surfaces of the low-resistance conductive films 51 and 61 uncovered as the bottom surfaces.

Specifically, the transparent cap films 53 and 63 formed of the ITO films are selectively removed by etching with, for example, a sulfuric acid-based mixed acid using, as etching masks, the interlayer insulating film 54 and the protective insulating film 64 having the contact hole 57L and the contact hole 67L, respectively. Subsequently, the low-reflection films 52 and 62 formed of the Al alloy nitride films are selectively removed by etching with, for example, a mixed acid of phosphoric acid, nitric acid, and acetic acid using the protective insulating film 64 and the interlayer insulating film 54 as etching masks.

As a result, the contact holes 57 and 67 that have the uncovered surfaces of the low-resistance conductive film 51 and the low-resistance conductive film 61, respectively, in the lead-out wiring region A8 are obtained, to thereby complete the lower-layer terminal portion 17A formed of only the low-resistance conductive film 51 and the upper-layer terminal portion 18A formed of only the low-resistance conductive film 61.

The etching treatment of the transparent caps 53 and 63 in the above-mentioned step that obtains the lower-layer terminal portion 17A and the upper-layer terminal portion 18A is performed while the color filter layer 40 that has already been formed is disposed on the lower surface of the transparent substrate 27. In a case where the etching treatment is particularly wet etching treatment, however, it suffices that a chemical solution is supplied to the lead-out wiring region A8 of the upper surface of the transparent substrate 27, and a contact area between the device and the lower surface of the transparent substrate 27 during the step of the wet etching treatment is typically small, so that damage to the color filter layer 40 can be prevented.

As a result, as shown in FIG. 23, the CF-equipped touch panel substrate 30A including the touch sensor layer 50 formed on the surface (touch panel forming surface) of the transparent substrate 27 and the color filter layer 40 formed on the back surface (color filter forming surface) of the transparent substrate 27 is completed.

In other words, the CF-equipped touch panel substrate 30A including the touch sensor layer 50 and the color filter layer 40 integrally formed on the surface and the back surface respectively is completed as the counter substrate of the TFT array substrate 20.

In the steps shown in FIGS. 22 and 23, the structure shown in FIG. 21 is turned upside down, and the transparent cap films 53 and 63 forming the bottom surfaces of the contact holes 57L and 67L respectively are removed. Then, the low-reflection films 52 and 62 are removed to form the contact hole 57 that reaches the low-resistance conductive film 51 being the lower layer and the contact hole 67 that reaches the low-resistance conductive film 61 being the upper layer.

Instead of this formation method, an etching treatment can also be performed by supplying an etching chemical solution to the contact holes 57L and 67L in the lower surface of the transparent substrate 27 in the step of the etching treatment without turning the structure shown in FIG. 21 upside down. In this case, the touch sensor layer 50 being the lower surface has relatively high hardness, so that occurrence of defects such as a scratch is suppressed, which is more favorable.

It is assumed that the transparent cap films 53 and 63 are formed of a material, such as crystallized ITO, that is hardly selectively removed by etching with a typical etching solution in the etching treatment for forming the contact holes 57 and 67 for forming the external terminal portions (lower-layer terminal portion 17A, upper-layer terminal portion 18A). In this case, it is preferable that after the transparent cap films 53 and 63 in the lead-out wiring region A8 are selectively removed by etching, a step of crystallizing the transparent cap films 53 and 63 remaining is performed.

In the manufacturing method described above, the transparent cap films 53 and 63 (films functioning as etching protective films) being the ITO films are formed on the Al alloy nitride films forming the low-reflection films 52 and 62, thereby preventing the Al alloy nitride films forming the low-reflection films 52 and 62 from being directly exposed to an alkaline resist stripping solution at the time of removing the resist 71 and the resist 72 with the resist stripping solution. Therefore, the Al alloy nitride films forming the low-reflection films 52 and 62 are etched with the resist stripping solution, so that the films have thin thicknesses, thereby preventing an anti-reflection function expected from the low-reflection films 52 and 62 from being degraded and lost due to increase in reflectance. Thus, the low-reflection films 52 and 62 allow to provide, with stability, a touch panel that includes low-reflective wiring patterns (patterns of the lower-layer wire 15 and the upper-layer wire 16) kept within a designed range of reflectances and that is excellent in visibility of a display image for outdoor use.

The example in which the transparent cap films 53 and 63 are made of the amorphous ITO films is described above, but this is not restrictive. Materials that do not damage the low-reflection films 52, 62 and the low-resistance conductive films 51, 61 during the etching treatment of the transparent cap films 53 and 63 may be selected for the transparent cap films 53 and 63. For example, etching can be performed with an oxalic acid-based solution when amorphous indium zinc oxide (IZO) is used for the transparent cap films 53 and 63, which does not damage the low-reflection films 52 and 62 as well as the low-resistance conductive films 51 and 61.

The example above shows the etching treatment of the Al alloy nitride films with the mixed acid of phosphoric acid, nitric acid, and acetic acid, but etching with an alkaline solution may be performed, and dry etching may also be performed.

When being etched with a solution having high etching selectivity to the low-resistance conductive films 51 and 61, the Al alloy nitride films forming the low-reflection films 52 and 62 can have a higher degree of nitriding than that in the case using the above-mentioned mixed acid, and thus reflection can also be further reduced.

To form the CF-equipped touch panel substrate 30A, a transparent conductive film such as ITO and pillar spacers for adjusting gaps between liquid crystal cells, which are omitted from FIGS. 4 to 23, are disposed as necessary. The transparent cap films 53 and 63 as well as the transparent conductive film are preferably selected for forming the transparent conductive film such as the ITO so as to have etching selectivity at the time of removing the transparent cap films 53 and 63 in the contact holes 57L and 67L, respectively.

In this manner, in the CF-equipped touch panel substrate 30A (touch panel structure) of the first preferred embodiment, the low-reflection film 52 and the transparent cap film 53 are formed on the bottom surface of the halfway opening being the contact hole 57L in the touch sensor layer 50 and the low-reflection film 62 and the transparent cap film 63 are formed on the bottom surface of the halfway opening being the contact hole 67L in the touch sensor layer 50 when the color filter layer 40 shown in FIGS. 14 to 21 is formed.

Therefore, even if the color filter layer 40 is manufactured after the touch sensor layer 50 is formed, the low-resistance conductive films 51, 61 and the low-reflection films 52, 62 are not influenced because the transparent cap film 53 being the uppermost layer on the bottom surface of the contact hole 57L in the lead-out wiring region A8 protects the low-resistance conductive film 51 and the low-reflection film 52 while the transparent cap film 63 being the uppermost layer on the bottom surface of the contact hole 67L in the lead-out wiring region A8 protects the low-resistance conductive film 61 and the low-reflection film 62. As a result, manufacturing yields of the CF-equipped touch panel substrate 30A can be improved.

Consequently, the low-resistance conductive film 51 (61) is formed of a low-resistance material such as aluminum while the low-reflection film 52 (62) can be formed of a low-reflection material. Thus, the CF-equipped touch panel substrate 30A in which the touch sensor layer 50 including the lower-layer wire 15 and the upper-layer wire 16 (laminated wiring) is formed without performance degradation can be obtained, the lower-layer wire 15 and the upper-layer wire 16 having characteristics of a low resistance and a low reflectance.

In addition, in the CF-equipped touch panel substrate 30A of the first preferred embodiment, the lower-layer terminal portion 17A and the upper-layer terminal portion 18A (terminal portion 5) are formed by only the low-resistance conductive film 51 and the low-resistance conductive film 61, respectively. The lower-layer terminal portion 17A and the upper-layer terminal portion 18A are electrically connected with the lower-layer wire 15 (X position detecting wire 2) and the upper-layer wire 16 (Y position detecting wire 3) through the lead-out wires 4, respectively. Thus, in the CF-equipped touch panel substrate 30A, the matrix wires formed of the lower-layer wire 15 and the upper-layer wire 16 indispensable for achieving the touch sensor function can be formed to have a low resistance and a low reflectance.

After the completion of the CF-equipped touch panel substrate 30A, the CF-equipped touch panel substrate 30A that undergoes a cell assembling step is bonded to the TFT array substrate 20 with a sealing material. Moreover, the liquid crystal portion 35 made of liquid crystal materials and the sealing material 36 are disposed in the gap between the CF-equipped touch panel substrate 30A and the TFT array substrate 20, to thereby form touch-panel-integrated liquid crystal cells (the CF-equipped touch panel substrate 30A+ the liquid crystal portion 35+the TFT array substrate 20 (driving unit of the liquid crystal portion 35)).

Subsequently, a polarizing plate 66 or the like is disposed on the surface of the touch sensor layer 50 and the TFT array substrate 20. Furthermore, flexible printed circuits (FPCs) and a control substrate are electrically connected to the lead-out wiring region A8 of the touch sensor layer 50 through the lower-layer terminal portion 17A and the upper-layer terminal portion 18A formed of the low-resistance conductive film 51 and the low-resistance conductive film 61 respectively, thereby achieving electrical connection having a low resistance and high reliability.

Subsequently, the touch-panel-integrated liquid crystal cells are housed with the backlight unit 21 in the housing 14, and thus the display apparatus 100 that has the structure shown in FIGS. 1 and 2 and includes the CF-equipped touch panel substrate 30A in the first preferred embodiment is completed.

In this manner, by performing the step of forming the CF-equipped touch panel substrate 30A and the step of forming the liquid crystal cells such that the interlayer insulating film 54 and the protective insulating film 64 side in the display region A7 are a display observation surface, the display apparatus 100 including the CF-equipped touch panel substrate 30A in the first preferred embodiment can be manufactured.

Therefore, the display apparatus 100 including the CF-equipped touch panel substrate 30A in which the touch sensor layer 50 formed of the lower-layer wire 15 and the upper-layer wire 16 being the laminated wiring is formed without performance degradation can be obtained, the lower-layer wire 15 and the upper-layer wire 16 having characteristics of a low resistance and a low reflectance.

Second Preferred Embodiment

Figure 24:
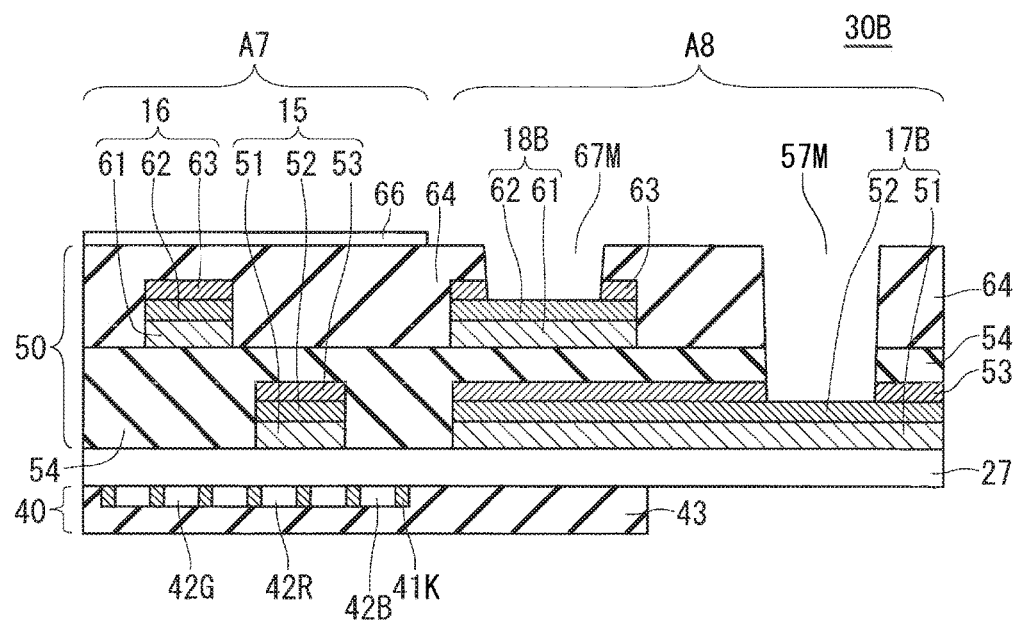
FIG. 24 is a cross-sectional view showing the B-B section in FIG. 1 and a cross-sectional structure of a lead-out wiring region of X position detecting wires and Y position detecting wires in the second preferred embodiment.

Hereinafter, with reference to the cross-sectional structure of the display apparatus 100, the CF-equipped touch panel substrate 30B (touch panel structure) in a second preferred embodiment of the present invention is described. FIG. 24 is a cross-sectional view showing the B-B section in the display region A7 in FIG. 1 and a cross-sectional structure of the second preferred embodiment in which each terminal portion in the lead-out wiring region A8 for the X position detecting wires 2 and the Y position detecting wires 3 is extracted and abstract. Hereinafter, the same components as those of the CF-equipped touch panel substrate 30A in the first preferred embodiment are denoted by the same references, descriptions are appropriately omitted, and differences between the first preferred embodiment and this preferred embodiment are mainly described.

A contact hole 57M (opening) is formed in the lead-out wiring region A8 while penetrating the protective insulating film 64, the interlayer insulating film 54, and the transparent cap film 53 and having the surface of the low-reflection film 52 uncovered as a bottom surface. The low-reflection film 52 and the low-resistance conductive film 51 below the bottom surface of the contact hole 57M form a lower-layer terminal portion 17B (first external terminal portion).

Similarly, a contact hole 67M (opening) is formed in the lead-out wiring region A8 while penetrating the protective insulating film 64 and the transparent cap film 63 and having the surface of the low-reflection film 62 uncovered as a bottom surface. The low-reflection film 62 and the low-resistance conductive film 61 below the bottom surface of the contact hole 67M form an upper-layer terminal portion 18B (second external terminal portion).

In this manner, the low-reflection film 52 and the low-resistance conductive film 51 remain on the bottom of the contact hole 57M in the lead-out wiring region A8, and thus the low-reflection film 52 and the low-resistance conductive film 51 form the lower-layer terminal portion 17B. The low-reflection film 62 and the low-resistance conductive film 61 remain on the bottom of the contact hole 67M in the lead-out wiring region A8, and thus the low-reflection film 62 and the low-resistance conductive film 61 form the upper-layer terminal portion 18B.

FIGS. 25 and 26 are cross-sectional views showing a method for manufacturing the CF-equipped touch panel substrate 30B in the second preferred embodiment shown in FIG. 24. Hereinafter, with reference to the drawings, the method for manufacturing the CF-equipped touch panel substrate 30B in the second preferred embodiment is described.

First, the same steps in the manufacturing method in the first preferred embodiment shown in FIGS. 4 to 21 are performed to obtain the structure shown in FIG. 21.

Then, as shown in FIG. 25, the structure shown in FIG. 21 is turned upside down such that the touch panel forming surface faces upward.

Subsequently, as shown in FIG. 26, the transparent cap films 53 and 63 uncovered in the halfway openings being the contact holes 57L and 67L are removed, to thereby obtain openings (final openings) being the contact holes 57M and 67M of the shapes that have the uncovered surfaces of the low-resistance conductive films 51 and 61.

Specifically, the transparent cap films 53 and 63 formed of the ITO films are selectively removed by etching with, for example, a sulfuric acid-based mixed acid using, as etching masks, the interlayer insulating film 54 and the protective insulating film 64 having the contact hole 57L and the contact hole 67L, respectively.

As a result, the contact holes 57M and 67M that have the uncovered surfaces of the low-reflection film 52 and the low-reflection film 62, respectively, in the lead-out wiring region A8 are obtained, to thereby complete the lower-layer terminal portion 17B formed of the low-reflection film 52 and the low-resistance conductive film 51 and the upper-layer terminal portion 18B formed of the low-reflection film 62 and the low-resistance conductive film 61.

The etching treatment of the transparent caps 53 and 63 in the above-mentioned step that obtains the lower-layer terminal portion 17B and the upper-layer terminal portion 18B is performed while the color filter layer 40 that has already been formed is disposed on the lower surface of the transparent substrate 27. In a case where the etching treatment is particularly wet etching treatment, however, it suffices that a chemical solution is supplied to the lead-out wiring region A8 of the upper surface of the transparent substrate 27, and a contact area between the device and the lower surface of the transparent substrate 27 during the step of the wet etching treatment is typically small, so that damage to the color filter layer 40 can be prevented.

As a result, as shown in FIG. 26, the CF-equipped touch panel substrate 30B including the touch sensor layer 50 formed on the surface of the transparent substrate 27 and the color filter layer 40 formed on the back surface of the transparent substrate 27 is completed.

In the steps shown in FIGS. 25 and 26, the structure shown in FIG. 21 is turned upside down, and the transparent cap films 53 and 63 uncovered on the bottom surfaces of the contact holes 57L and 67L are removed by the etching treatment to form the contact hole 57M that reaches the low-reflection film 52 being the lower layer and the contact hole 67M that reaches the low-reflection film 62 being the upper layer.

Instead of this formation method, an etching treatment can also be performed by supplying an etching chemical solution to the contact holes 57M and 67M in the lower surface of the transparent substrate 27 in the step of the etching treatment without turning the structure shown in FIG. 21 upside down. In this case, the touch sensor layer 50 being the lower surface has relatively high hardness, so that occurrence of defects such as a scratch is suppressed, which is more favorable.

It is assumed that the transparent cap films 53 and 63 are formed of a material, such as crystallized ITO, that is hardly selectively removed by etching with a typical etching solution at the time of etching in the opening formation step of forming the contact holes 57M and 67M during the formation of the external terminal portions (lower-layer terminal portion 17A, upper-layer terminal portion 18A). In this case, it is preferable that after the transparent cap films 53 and 63 in the lead-out wiring region A8 are selectively removed by etching, a step of crystallizing the transparent cap films 53 and 63 remaining is performed.

In the manufacturing method described above, the transparent cap films 53 and 63 being the ITO films are formed on the Al alloy nitride films forming the low-reflection films 52 and 62. Thus, similarly to the first preferred embodiment, the Al alloy nitride films forming the low-reflection films 52 and 62 are etched with the resist stripping solution for removing the resist 71 and the resist 72, so that the films have thin thicknesses, thereby preventing an anti-reflection function expected from the low-reflection films 52 and 62 from being degraded and lost due to increase in reflectance. Consequently, the low-reflection films 52 and 62 allow to provide, with stability, a touch panel that includes low-reflective wiring patterns kept within a designed range of reflectances and that is excellent in visibility of a display image for outdoor use.

The example in which the transparent cap films 53 and 63 are made of the amorphous ITO films is described above, but this is not restrictive. Materials that do not damage the low-reflection films 52, 62 and the low-resistance conductive films 51, 61 at the time of etching the transparent cap films 53 and 63 may be selected for the transparent cap films 53 and 63. For example, etching can be performed with an oxalic acid-based solution when amorphous IZO is used for the transparent cap films 53 and 63, which does not damage the low-reflection films 52 and 62 as well as the low-resistance conductive films 51 and 61.

In this manner, in the CF-equipped touch panel substrate 30B (touch panel structure) of the second preferred embodiment, the low-reflection film 52 and the transparent cap film 53 are formed on the bottom surface of the halfway opening being the contact hole 57L in the touch sensor layer 50 and the low-reflection film 62 and the transparent cap film 63 are formed on the bottom surface of the halfway opening being the contact hole 67L in the touch sensor layer 50 when the color filter layer 40 shown in FIGS. 14 to 21 is formed.

Therefore, even if the color filter layer 40 is manufactured after the touch sensor layer 50 is formed, the low-resistance conductive films 51, 61 and the low-reflection films 52, 62 are not influenced because the transparent cap film 53 being the uppermost layer on the bottom surface of the contact hole 57L in the lead-out wiring region A8 protects the low-resistance conductive film 51 and the low-reflection film 52 while the transparent cap film 63 being the uppermost layer on the bottom surface of the contact hole 67L in the lead-out wiring region A8 protects the low-resistance conductive film 61 and the low-reflection film 62. As a result, manufacturing yields of the CF-equipped touch panel substrate 30B can be improved.

In this manner, the CF-equipped touch panel substrate 30B in the second preferred embodiment has substantially the same effects as those of the CF-equipped touch panel substrate 30A in the first preferred embodiment.

Furthermore, in the final stage on completion, the low-reflection film 52 and the low-reflection film 62 remain as the lower-layer terminal portion 17B and the upper-layer terminal portion 18B of the CF-equipped touch panel substrate 30B in the second preferred embodiment, respectively. Thus, even when a manufacturing step is changed such that the lower-layer terminal portion 17B and the upper-layer terminal portion 18B are formed before the formation of the color filter layer 40 shown in FIGS. 14 to 21, the low-resistance conductive films 51 and 61 in the lead-out wiring region A8 are not influenced because they are protected by the low-reflection films 52 and 62 being the upper layers in a case where the low-reflection films 52 and 62 are films that do not allow etching with an alkaline solution.

In this manner, the second preferred embodiment can form the low-resistance conductive films 51 and 61 with a low-resistance material such as aluminum even when the manufacturing step is changed as described above. Consequently, the second preferred embodiment achieves inherent effects of obtaining the CF-equipped touch panel substrate 30B in which the touch sensor layer 50 including the lower-layer wire 15 and the upper-layer wire 16 is formed without performance degradation in the case where the low-reflection films 52 and 62 are films that do not allow etching with the alkaline solution, the lower-layer wire 15 and the upper-layer wire 16 having characteristics of a low resistance and a low reflectance.

After the completion of the CF-equipped touch panel substrate 30B, the CF-equipped touch panel substrate 30B that undergoes a cell assembling step is bonded to the TFT array substrate 20 with a sealing material. Moreover, the liquid crystal portion 35 made of liquid crystal materials and the sealing material 36 are disposed in the gap between the CF-equipped touch panel substrate 30B and the TFT array substrate 20, to thereby form touch-panel-integrated liquid crystal cells (the CF-equipped touch panel substrate 30B+ the liquid crystal portion 35+the TFT array substrate 20 (driving unit of the liquid crystal portion 35)).

Subsequently, the polarizing plate 66 or the like is disposed on the surface of the touch sensor layer 50 and the TFT array substrate 20. Furthermore, the FPCs or the like are electrically connected to the lead-out wiring region A8 of the touch sensor layer 50 through the lower-layer terminal portion 17B formed of the low-reflection film 52 and the low-resistance conductive film 51 and the upper-layer terminal portion 18B formed of the low-reflection film 62 and the low-resistance conductive film 61.

The lower-layer terminal portion 17B and the upper-layer terminal portion 18B are typically connected with the FPCs through an anisotropic conductive film (ACF). A particle diameter of conductive particles included in the ACF and thicknesses of the low-reflection films 52 and 62 are preferably taken into consideration. Specifically, with the conductive particles of a shape having a diameter and projections that sufficiently penetrate the thicknesses of the low-reflection films 52 and 62, the conductive particles in the ACF penetrate the low-reflection films 52 and 62 and reach the low-resistance conductive films 51 and 61 to be electrically connected with the control substrate. This can achieve electrical connection having a low resistance and high reliability between the lower-layer terminal portion 17B and the upper-layer terminal portion 18B and the FPCs.

Subsequently, the touch-panel-integrated liquid crystal cells are housed with the backlight unit 21 in the housing 14, to thereby complete the display apparatus 100 that includes the CF-equipped touch panel substrate 30B in the second preferred embodiment and has the structure shown in FIGS. 1 and 2.

In this manner, by performing the step of forming the CF-equipped touch panel substrate 30B and the step of forming the liquid crystal cells such that the interlayer insulating film 54 and the protective insulating film 64 side in the display region A7 are a display observation surface, the display apparatus 100 including the CF-equipped touch panel substrate 30B in the second preferred embodiment can be manufactured.

Therefore, the display apparatus 100 including the CF-equipped touch panel substrate 30B in which the touch sensor layer 50 formed of the lower-layer wire 15 and the upper-layer wire 16 being the laminated wiring is formed without performance degradation can be obtained, the lower-layer wire 15 and the upper-layer wire 16 having characteristics of a low resistance and a low reflectance.

In the first preferred embodiment and the second preferred embodiment described above, the CF-equipped touch panel substrate 30 (including 30A and 30B) for the so-called on-cell improves yield rate of the low-resistance wiring structure of the low-resistance conductive film 51 (61) such as Al, and thus a thickness of the module in the whole device can be reduced, the CF-equipped touch panel substrate 30 (including 30A and 30B) including the touch sensor layer 50 and the color filter 40 formed on the surface and the back surface of the same transparent substrate 27, respectively. As a result, the display apparatus 100 including the CF-equipped touch panel substrate 30 housed with the TFT array substrate 20 in the housing 14 can have the effects of reducing costs by reducing thickness and weight, which leads to an improvement in functions, and by simplifying the structure.

<Comparison with Prior Invention>

The applicant of the present application creates, before the claimed invention including the first preferred embodiment and the second preferred embodiment, the prior invention (Japanese Patent Application No. JP2014-130972), which is not publically known, for achieving the similar purposes.

FIG. 27 is a cross-sectional view showing a cross-sectional structure of a CF-equipped touch panel substrate 30P according to the prior invention. FIG. 27 is a cross-sectional view showing the B-B section in the display region A7 in FIG. 1 and a cross-sectional structure in which each terminal portion in the lead-out wiring region A8 for the X position detecting wires 2 and the Y position detecting wires 3 is extracted and abstract. Hereinafter, the same components as those of the CF-equipped touch panel substrate 30A in the first preferred embodiment are denoted by the same references, descriptions are appropriately omitted, and characteristic portions of the CF-equipped touch panel substrate 30P are described.

A contact hole 57 is formed in the lead-out wiring region A8 while penetrating the protective insulating film 64, the interlayer insulating film 54, the transparent cap film 53, and the low-reflection film 52 and having the surface of the low-resistance conductive film 51 uncovered. A protective conductive film 55 is formed on the bottom surface and the sides of the contact hole 57 including the surface of the low-resistance conductive film 51 as well as part of the surface of the protective insulating film 64. The laminated structure of the low-resistance conductive film 51 and the protective conductive film 55 form a lower-layer terminal portion 17P for the lower-layer wire 15.

Similarly, a contact hole 67 is formed in the lead-out wiring region A8 while penetrating the transparent cap film 63 and the low-reflection film 62 and having the surface of the low-resistance conductive film 61 uncovered. A protective conductive film 65 is formed on the bottom surface and the sides of the contact hole 67 including the surface of the low-resistance conductive film 61 as well as part of the surface of the protective insulating film 64. The laminated structure of the low-resistance conductive film 61 and the protective conductive film 65 form an upper-layer terminal portion 18P for the upper-layer wire 16.

Hereinafter, the CF-equipped touch panel substrate 30A in the first preferred embodiment and the CF quipped touch panel substrate 30B in the second preferred embodiment are compared with the CF-equipped touch panel substrate 30P in the prior invention.

The protective conductive films 55 and 65 formed in the CF-equipped touch panel substrate 30P are components that are newly added for the purpose of protecting the low-resistance conductive films 51 and 61 being the lower layers, respectively. Therefore, the protective conductive films 55 and 65 are additionally formed, causing the increase in a cost of the device and a manufacturing cost.

On the other hand, the CF-equipped touch panel substrates 30A and 30B do not need the components corresponding to the protective conductive films 55 and 65, so that the cost of the device and the manufacturing cost can be reduced.

Moreover, in the CF-equipped touch panel substrate 30B in the second preferred embodiment, the low-reflection films 52 and 62 remain as the components of the lower-layer terminal portion 17B and the upper-layer terminal portion 18B, respectively. This eliminates the step of removing the low-reflection films 52 and 62, so that the manufacturing cost can be reduced.

Furthermore, when the protective conductive films 55 and 65 are formed in the lower layer and the upper layer similarly to the CF-equipped touch panel substrate 30P, the protective conductive films 55 and 65 need to be formed in the contact holes 57 and 67 being the openings having the two different depths, respectively. Thus, coverage defects of the protective conductive films 55 and 65 at the opening edge portions of the contact holes 57 and 67 may occur. In a case of the occurrence of the coverage defect, the developing solution used for forming the color filter layer 40 enters the gap of the protective conductive films 55 and 65 forming the lower-layer terminal portion 17P and the upper-layer terminal portion 18P, leading to corrosion of Al components of the low-resistance conductive films 51 and 61.

On the other hand, in the CF-equipped touch panel substrates 30A and 30B, when the color filter layer 40 is formed, the low-reflection film 52 and the transparent cap film 53 are laminated on the low-resistance conductive film 51 without a gap while the low-reflection film 62 and the transparent cap film 63 are laminated on the low-resistance conductive film 61 without a gap. Thus, a rate of occurrence of the corrosion phenomenon by the developing solution in the step of manufacturing the color filter layer 40 can be further reduced.

<Others>

An outermost layer of the display surface side (observer side) is bonded to a protective plate glass with an adhesive material to increase strength, thereby increasing durability.

The preferred embodiments described above give the examples in which the low-resistance wiring being the low-resistance conductive films 51 and 61, the low-reflection films 52 and 62, and the transparent cap films 53 and 63 are applied to the wiring (the lower-layer wire 15 and the upper-layer wire 16) of the touch sensor layer 50, but they may be applied to the wiring of the liquid crystal display being the display apparatus 100 and may also be applied to a light-shielding layer that reduces reflections of the display surface side of the liquid crystal display.

In addition, according to the present invention, the above preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A method for manufacturing a touch panel structure, comprising the steps of:
    (a) preparing a substrate having one main surface and an other main surface;
    (b) forming a main portion of a touch sensor layer on the one main surface of said substrate, said touch sensor layer having a display region and a lead-out wiring region;
    (c) forming a color filter layer on the other main surface of said substrate after performing said step (b), said color filter layer being formed to overlap said display region of said touch sensor layer in plan view; and
    (d) forming an external terminal portion for external connection in said lead-out wiring region after performing said step (c), wherein said step (b) includes the steps of:

(b-1) forming a laminated wiring on said substrate, said laminated wiring being formed by a conductive film, a low-reflection film, and a transparent film laminated in the stated order;

(b-2) forming an insulating film that covers said laminated wiring; and (b-3) selectively forming a halfway opening in said lead-out wiring region, said halfway opening penetrating said insulating film and having a top surface of said transparent film uncovered as a bottom surface of said opening, and said step (d) includes the step of (d-1) forming a final opening that penetrates at least said transparent film on the bottom surface of said halfway opening, said external terminal portion being formed by at least said conductive film below a bottom surface of said final opening.

2. The method for manufacturing a touch panel structure according to claim 1, wherein said step (d-1) includes the step of (d-1-1) forming said final opening that penetrates said transparent film and said low-reflection film on the bottom surface of said halfway opening and has a surface of said conductive film uncovered as a bottom surface, said external terminal portion being formed by said conductive film below the bottom surface of said final opening.

3. The method for manufacturing a touch panel structure according to claim 1, wherein said step (d-1) includes the step of (d-1-2) forming said final opening that penetrates said transparent film on the bottom surface of said halfway opening and has a surface of said low-reflection film uncovered as a bottom surface, said external terminal portion being formed by said low-reflection film and said conductive film below the bottom surface of said final opening.

4. A method for manufacturing a display apparatus, comprising the steps of:

obtaining said touch panel structure by the method for manufacturing a touch panel structure according to claim 1; and forming structures of a liquid crystal portion and a driving unit of said liquid crystal portion except for said touch panel structure such that said insulating film side in said display region serves as a display observation surface.

* * * * *